US012649837B2

(12) United States Patent
Otsuka

(10) Patent No.: US 12,649,837 B2
(45) Date of Patent: Jun. 9, 2026

(54) METHOD FOR PRODUCING POLYAMIDE-BASED RESIN MULTI-STAGE-EXPANDED BEADS

(71) Applicant: JSP CORPORATION, Tokyo (JP)

(72) Inventor: Tetsu Otsuka, Sapporo (JP)

(73) Assignee: JSP CORPORATION, Tokyo (JP)

( * ) Notice: Subject to any disclaimer, the term of this patent is extended or adjusted under 35 U.S.C. 154(b) by 550 days.

(21) Appl. No.: 18/030,561

(22) PCT Filed: Oct. 13, 2021

(86) PCT No.: PCT/JP2021/037922
§ 371 (c)(1),
(2) Date: Apr. 6, 2023

(87) PCT Pub. No.: WO2022/085538
PCT Pub. Date: Apr. 28, 2022

(65) Prior Publication Data
US 2023/0407035 A1 Dec. 21, 2023

(30) Foreign Application Priority Data

Oct. 22, 2020 (JP) ................................. 2020-177493
Apr. 13, 2021 (JP) ................................. 2021-067892

(51) Int. Cl.
| | |
|---|---|
| *C08J 9/18* | (2006.01) |
| *C08J 9/12* | (2006.01) |
| *C08J 9/228* | (2006.01) |

(52) U.S. Cl.
CPC . *C08J 9/18* (2013.01); *C08J 9/12* (2013.01); *C08J 9/228* (2013.01)

(58) Field of Classification Search
CPC ............ B29C 44/3453; B29C 44/3461; B29K 2077/00; C08J 9/12; C08J 9/122; C08J 9/18; C08J 9/228; C08J 9/232; C08J 2201/034; C08J 2203/06; C08J 2377/00
See application file for complete search history.

(56) References Cited

U.S. PATENT DOCUMENTS

2012/0065286 A1* 3/2012 Pawloski ................ B29C 48/40
264/55
2012/0149792 A1* 6/2012 Shima ........................ C08J 9/18
521/59

2018/0044497 A1 2/2018 Kondo et al.
2020/0032023 A1 1/2020 Nakamoto
2021/0189089 A1 6/2021 Hayashi et al.
2021/0317308 A1 10/2021 Fujino et al.
2022/0169849 A1 6/2022 Nakayama et al.

FOREIGN PATENT DOCUMENTS

| | | |
|---|---|---|
| JP | 2011-105879 A | 6/2011 |
| JP | 2018-053380 A | 4/2018 |
| JP | 2018-131620 A | 8/2018 |
| WO | 2016/147582 A1 | 9/2016 |
| WO | 2020/031803 A1 | 2/2020 |
| WO | 2020/050301 A1 | 3/2020 |
| WO | 2020/196893 A1 | 10/2020 |

OTHER PUBLICATIONS

Dec. 7, 2021 International Search Report issued in International Patent Application No. PCT/JP2021/037922.
Dec. 7, 2021 Written Opinion issued in International Patent Application No. PCT/JP2021/037922.
Jul. 24, 2024 Office Action issued in Chinese Patent Application No. 202180069512.1.
Aug. 16, 2024 Extended Search Report issued in European Patent Application No. 21882679.0.
Jan. 6, 2025 Office Action issued in Chinese Patent Application No. 202180069512.1.

* cited by examiner

*Primary Examiner* — John M Cooney
(74) *Attorney, Agent, or Firm* — OLIFF PLC

(57) ABSTRACT

A method for producing polyamide-based resin multi-stage expanded beads includes an internal pressure applying step of placing polyamide-based resin expanded beads in a pressure-resistant container, impregnating the polyamide-based resin expanded beads with a physical blowing agent in the pressure-resistant container to apply internal pressure higher than atmospheric pressure; and a heating and foaming step of heating and expanding the polyamide-based resin expanded beads to which internal pressure is applied obtained in the internal pressure applying step to obtain polyamide-based resin multi-stage expanded beads having apparent density lower than that of polyamide-based resin expanded beads used in the internal pressure applying step, in the internal pressure applying step, polyamide-based resin expanded beads in a wet state having a water content of 1% or more being impregnated with the physical blowing agent at a temperature higher than change-point temperature of storage modulus of the polyamide-based resin expanded beads in a wet state.

12 Claims, 3 Drawing Sheets

METHOD FOR PRODUCING POLYAMIDE-BASED RESIN MULTI-STAGE-EXPANDED BEADS

TECHNICAL FIELD

The present invention relates to a method for producing polyamide-based resin multi-stage expanded beads, which makes it possible to provide polyamide-based resin expanded beads having a high expansion ratio by multi-stage foaming.

BACKGROUND ART

A polyamide-based resin is known as a resin excellent in heat resistance, abrasion resistance, chemical resistance, and the like among general resin materials. A foamed molded article obtained by expanding a polyamide-based resin can be reduced in weight while maintaining the excellent properties. Therefore, the polyamide-based resin foamed molded article is expected to be developed in application to automobile parts and other applications. For example, Patent Literature 1 discloses a polyamide-based resin foamed molded article excellent in heat resistance and sound insulation properties.

In recent years, a lighter expanded beads molded article is sometimes required. In the technical field of thermoplastic resin expanded beads, a multi-stage foaming method is known as a method for reducing weight of an expanded beads molded article. The multi-stage foaming method refers to a foaming method in which expanded beads are impregnated with pressurized air or a physical blowing agent such as carbon dioxide to apply an internal pressure, and then heated to obtain expanded beads having an apparent density lower than that of the original expanded beads. Patent Literature 1 also describes that multi-stage foaming is performed in order to increase the expansion ratio of polyamide-based resin expanded beads used for bead foam molding.

CITATION LIST

Patent Literature

Patent Literature 1: WO 2016/147582 A

SUMMARY OF INVENTION

Technical Problem

However, conventionally, multi-stage foaming of polyamide-based resin expanded beads has a problem that productivity is inferior to that of polyolefin-based resin expanded beads and the like. For example, in the multi-stage foaming of the polyamide-based resin expanded beads described in Patent Literature 1, it has been necessary to maintain a high temperature when the polyamide-based resin expanded beads are impregnated with a physical blowing agent. Therefore, the multi-stage foaming of Patent Literature 1 had a large load on a device and a high production cost. In addition, Patent Literature 1 describes that, in particular, in the case of producing polyamide-based resin expanded beads having a low apparent density, a step of impregnating polyamide-based resin expanded beads with a physical blowing agent, maintaining a pressurized state for 24 hours, and then heating the polyamide-based resin expanded beads at 230° C. to re-expand the polyamide-based resin expanded beads is repeated twice, which requires a long time in addition to the large load on a device. Therefore, the conventional method for producing polyamide-based resin multi-stage expanded beads by a multi-stage foaming method has low productivity and is unsuitable for industrial production.

The present invention relates to a novel method for producing polyamide-based resin multi-stage expanded beads, which has been made in view of the above-described problems. That is, the present invention provides a method for producing polyamide-based resin multi-stage expanded beads having excellent productivity, the method enabling multi-stage foaming in which polyamide-based resin expanded beads are efficiently expanded by applying an internal pressure to the polyamide-based resin expanded beads at a lower temperature (for example, normal temperature) or in a shorter time than before in the production of polyamide-based resin multi-stage expanded beads having a low apparent density.

Solution to Problem

The method for producing polyamide-based resin multi-stage expanded beads of the present invention includes an internal pressure applying step of placing polyamide-based resin expanded beads in a pressure-resistant container, impregnating the polyamide-based resin expanded beads with a physical blowing agent in the pressure-resistant container to apply an internal pressure higher than atmospheric pressure; and a heating and foaming step of heating and foaming the polyamide-based resin expanded beads to which internal pressure is applied obtained in the internal pressure applying step to obtain polyamide-based resin multi-stage expanded beads having an apparent density lower than that of the polyamide-based resin expanded beads used in the internal pressure applying step, in the internal pressure applying step, the polyamide-based resin expanded beads in a wet state having a water content of 1% or more being impregnated with the physical blowing agent at a temperature higher than change-point temperature of storage modulus of the polyamide-based resin expanded beads in a wet state.

Advantageous Effects of Invention

The present invention provides a method for producing polyamide-based resin multi-stage expanded beads, which can apply an internal pressure to polyamide-based resin expanded beads at a lower temperature (for example, normal temperature) or in a shorter time than before, and can efficiently produce polyamide-based resin multi-stage expanded beads having a low apparent density.

DESCRIPTION OF EMBODIMENTS

Figure 1:
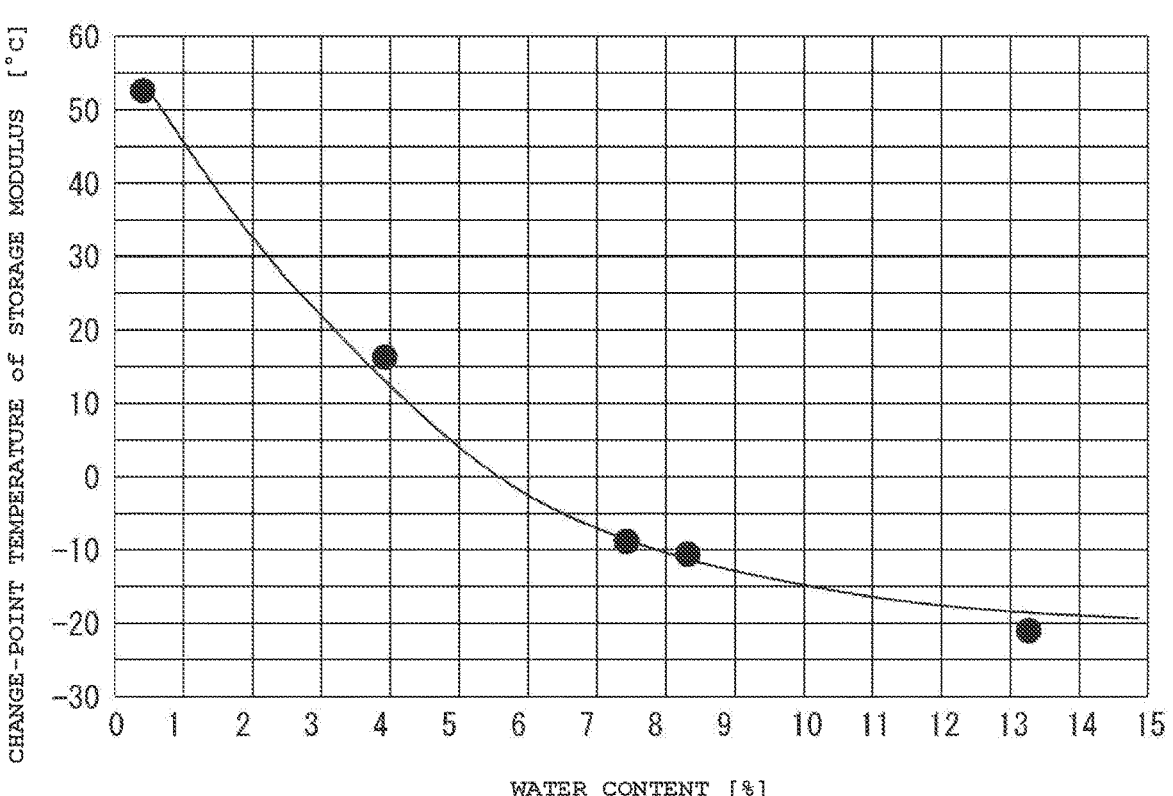
FIG. 1 is a graph plotting relationship between change-point temperature of storage modulus of polyamide-based resin expanded beads and water content of polyamide-based resin expanded beads.

Hereinafter, a method for producing polyamide-based resin multi-stage expanded beads of the present invention will be described.

In the following description, preferable numerical ranges of the present invention may be indicated as appropriate. In this case, the preferred range, more preferred range, and particularly preferred range for the upper and lower limits of the numerical range can be determined from all combinations of upper and lower limits. In the present specification, when expressed by using "X to Y" with numerical values or physical property values sandwiched therebetween, the expression is synonymous with "X or more and Y or less" and includes values of end points X and Y.

The method for producing polyamide-based resin multi-stage expanded beads of the present invention includes an internal pressure applying step and a heating and foaming step.

The internal pressure applying step is a step of impregnating polyamide-based resin expanded beads in a wet state having a water content of 1% or more with a physical blowing agent in a pressure-resistant container to apply an internal pressure higher than atmospheric pressure. In the following description, the "polyamide-based resin expanded beads in a wet state having a water content of 1% or more" subjected to the internal pressure applying step may be simply referred to as the "polyamide-based resin expanded beads in a wet state".

Also, the heating and foaming step is a step of heating and foaming the polyamide-based resin expanded beads to which internal pressure is applied obtained in the internal pressure applying step to obtain polyamide-based resin multi-stage expanded beads having an apparent density lower than that of the polyamide-based resin expanded beads used in the internal pressure applying step.

The present invention is characterized in that the temperature in the pressure-resistant container in the internal pressure applying step is adjusted to be higher than change-point temperature of storage modulus of the polyamide-based resin expanded beads in a wet state for a time exceeding 50% of the entire execution time of the internal pressure applying step.

In the following description, the "polyamide-based resin expanded beads to which internal pressure is applied obtained in the internal pressure applying step" to be subjected to the heating and foaming step may be simply referred to as the "polyamide-based resin expanded beads to which internal pressure is applied". Also, the "polyamide-based resin multi-stage expanded beads having an apparent density lower than that of the polyamide-based resin expanded beads used in the internal pressure applying step" obtained by performing the heating and foaming step may be simply referred to as the "polyamide-based resin multi-stage expanded beads having a small apparent density" or simply as the "polyamide-based resin multi-stage expanded beads".

The method for producing polyamide-based resin multi-stage expanded beads of the present invention having the above configuration (hereinafter, also referred to as the production method of the present invention) has excellent productivity and is capable of industrially providing polyamide-based resin expanded beads having a high expansion ratio.

That is, in the production method of the present invention, internal pressure can be applied to the polyamide-based resin expanded beads at a lower temperature (for example, normal temperature) or in a shorter time than before, and it is possible to efficiently produce polyamide-based resin multi-stage expanded beads having a low apparent density.

The present invention has been made by focusing on properties unique to a polyamide-based resin different from a polyolefin-based resin.

That is, the present inventor has studied a problem that the productivity of multi-stage foaming using conventional polyamide-based resin expanded beads is low. From this study, it was inferred that since the polyamide-based resin has a remarkably high gas barrier property as compared with a polyolefin-based resin such as a polypropylene-based resin, it is difficult to impregnate the polyamide-based resin expanded beads with a physical blowing agent. For this reason, conventionally, in order to obtain polyamide-based resin multi-stage expanded beads having a low apparent density, it has been considered that it is necessary to maintain a pressurized state for a long time or to pressurize the expanded beads under a high-temperature condition in a step of impregnating the expanded beads with a blowing agent.

Therefore, the present inventor has focused on the fact that the gas barrier property of the polyamide-based resin is reduced by significantly containing water. In addition, it has been found that an index of change in behavior of the hydrous polyamide-based resin can be confirmed by change-point temperature of storage modulus obtained from dynamic viscoelasticity measurement of the expanded beads. That is, as shown in FIG. 1, when the polyamide resin foam particles contain significant water, the temperature of change point of the storage modulus is lowered.

Therefore, the present inventor has considered that the gas barrier property of the polyamide-based resin constituting the expanded beads is reduced by heating the polyamide-based resin expanded beads at a temperature higher than the change-point temperature, and has completed the production method of the present invention. FIG. 1 is a graph plotting the relationship between the change-point temperature of storage modulus of polyamide-based resin expanded beads and the water content of the polyamide-based resin expanded beads. FIG. 1 shows a tendency that the change-point temperature of storage modulus decreases as the water content (%) increases for the polyamide-based resin expanded beads.

The present inventor has reached a technical idea of properly impregnating the expanded beads with a physical blowing agent by pressurizing the expanded beads at a relatively low temperature exceeding the change-point temperature to apply a high internal pressure to polyamide-based resin expanded beads in which change-point temperature of storage modulus is lowered and the gas barrier property is reduced by getting wet. Such a technical idea includes, in the internal pressure applying step, an aspect in which temperature condition is moderated by pressurizing at a relatively low temperature exceeding the change-point temperature, an aspect in which pressurization time is shortened by pressurizing at a relatively high temperature exceeding the change-point temperature, and an aspect in which higher internal pressure is applied by pressurizing at a relatively high temperature exceeding the change-point temperature.

By heating and foaming the polyamide-based resin expanded beads to which a high internal pressure is applied, polyamide-based resin multi-stage expanded beads having a low apparent density can be produced with high productivity.

Hereinafter, the production method of the present invention will be described in more detail.

Pre-Step

First, a pre-step performed before the internal pressure applying step in the present invention will be described. The pre-step includes a first preparation step of preparing polyamide-based resin beads, and a second preparation step of producing polyamide-based resin expanded beads using the polyamide-based resin beads.

A part or all of the pre-step described below may be performed separately from the production method of the present invention, or may be incorporated into the production method of the present invention as a step optionally added to the production method of the present invention.

First Preparation Step

In the first preparation step, the polyamide-based resin beads to be prepared may be a commercially available product or may be polyamide-based resin beads produced by a known method.

Examples of the method for producing polyamide-based resin beads include the following method. First, a polyamide-based resin and, if necessary, additives such as a cell controlling agent, a terminal blocking agent, and a colorant are charged into an extruder, and melt-kneaded to obtain a melt-kneaded material. Subsequently, the melt-kneaded material is extruded into a strand form through a small hole of a die attached to the tip of the extruder, cut into a predetermined size, and granulated to produce polyamide-based resin beads. Examples of the method for cutting the melt-kneaded material in a strand form include a strand cut method in which the extruded melt-kneaded material is cut with a pelletizer so as to have a predetermined weight, a hot cut method in which the melt-kneaded material is extruded into a gas phase and then immediately cut, an underwater cut method (UWC method) in which the melt-kneaded material is extruded into water and then immediately cut, and the like.

The polyamide-based resin to be used for the production of the polyamide-based resin beads may be a single resin or a mixed resin obtained by combining two or more types thereof.

The polyamide-based resin includes polyamide or a polyamide copolymer, and a polyamide copolymer is preferable.

Examples of the polyamide include homopolymers such as poly(6-aminohexanoic acid) [polycaproamide, nylon 6], which is also known as, poly(caprolactam), poly(laurolactam) [nylon 12], poly(hexamethylene adipamide) [nylon 66], poly(7-aminoheptanoic acid) [nylon 7], poly(8-aminooctanoic acid) [nylon 8], poly(9-aminononanoic acid) [nylon 9], poly(10-aminodecanoic acid) [nylon 10], poly(11-aminoundecanoic acid) [nylon 11], poly(hexamethylene sebacamide) [nylon 610], poly(decamethylene sebacamide) [nylon 1010], poly(hexamethylene azelamide) [nylon 69], poly(tetramethylene adipamide) [nylon 46], poly(tetramethylene sebacamide) [nylon 410], poly(pentamethylene adipamide) [nylon 56] and poly(pentamethylene sebacamide) [nylon 510].

The polyamide copolymer means a copolymer having two or more types of repeating units and having an amide bond in at least a part of each repeating unit.

Examples of the polyamide copolymer include polycaproamide/polyhexamethylene adipamide copolymer [nylon 6/66], caprolactam/hexamethylene diaminoadipic acid/lauryl lactam [nylon 6/66/12], caprolactam/lauryl lactam copolymer [nylon 6/12], and the like.

As the polyamide-based resin, these polyamides and polyamide copolymers may be used singly or two or more types thereof may be used in combination. Among the above polyamide-based resins, one type selected from nylon 6, nylon 66, nylon 6/66/12, and nylon 6/66, or a combination of two or more of them is preferred, and nylon 6/66 is more preferred.

The melting point of the polyamide-based resin is, for example, preferably 180° C. or more, more preferably 185° C. or more, and further preferably 190° C. or more from the viewpoint of enhancing heat resistance of an expanded beads molded article obtained by molding the resulting multi-stage expanded beads. On the other hand, the melting point is preferably 280° C. or less, more preferably 260° C. or less, and further preferably 240° C. or less from the viewpoint of reducing the load on a device when the polyamide-based resin expanded beads to which internal pressure is applied are heated with a heating medium.

When the resin constituting the expanded beads is a single polyamide-based resin, the melting point of the polyamide-based resin described above refers to the melting point of the polyamide-based resin. When the expanded beads are composed of a mixture of two or more types of polyamide-based resins, the melting point of the polyamide-based resin described above refers to the melting point of a mixture kneaded in advance with an extruder or the like.

The melting point of the polyamide-based resin can be determined as the temperature at the top of the melting peak (melting peak temperature) of a second DSC curve obtained by heating and melting the polyamide-based resin from 30° C. to a temperature 30° C. higher than the end of the melting peak at a heating rate of 10° C./min (first temperature rise), followed by maintaining the polyamide-based resin at the temperature for 10 minutes, then cooling the polyamide-based resin to 30° C. at a cooling rate of 10° C./min, and heating and melting the polyamide-based resin again to a temperature 30° C. higher than the end of the melting peak at a heating rate of 10° C./min, according to JIS K7121: 1987 by heat flux differential scanning calorimetry. When the DSC curve has a plurality of melting peaks, the melting peak temperature of the melting peak having the largest area is adopted as the melting point of the polyamide-based resin. The polyamide-based resin is allowed to stand under an environment of a temperature of 23° C. and a relative humidity of 50% for 24 hours or more to adjust the condition, and then the melting point is measured. As the measuring device, for example, a high-sensitive differential scanning calorimeter "EXSTAR DSC7020" (manufactured by SII NanoTechnology Inc.) or the like can be used.

The polyamide-based resin preferably has a flexural modulus of 1000 MPa or more, more preferably 1200 MPa or more, and further preferably 1500 MPa or more. The amide-based elastomer has a flexural modulus of approximately 600 MPa or less. When the flexural modulus of the polyamide-based resin is in the above range, the polyamide-based resin is less likely to shrink even when exposed to normal temperature after multi-stage foaming due to the high flexural modulus, and multi-stage expanded beads having a low apparent density are more easily obtained, which is preferable. The upper limit of the flexural modulus of the polyamide-based resin is approximately 3000 MPa.

The flexural modulus of the polyamide-based resin can be determined by allowing a test piece to stand at a temperature of 23° C. and a humidity of 50% for 24 hours or more, and then measuring the flexural modulus in accordance with JIS K7171: 2016.

The density of the polyamide-based resin is preferably 1.05 g/cm³ or more, and preferably 1.1 g/cm³ or more. The density of the amide-based elastomer is approximately less than 1.05 g/cm³. The density of the polyamide-based resin can be determined based on the method described in ISO1183-3.

The polyamide-based resin beads may contain other polymeric materials such as anther thermoplastic resin other than the polyamide-based resin or thermoplastic elastomer as long as the object and effect of the present invention are not impaired. Examples of the another thermoplastic resin include a polyethylene-based resin, a polypropylene-based resin, a polystyrene-based resin, a vinyl acetate resin, a thermoplastic polyester resin, an acrylic acid ester resin, a methacrylic acid ester resin, and the like. Examples of the thermoplastic elastomer include a styrene-based thermoplastic elastomer, an olefin-based thermoplastic elastomer, an amide-based thermoplastic elastomer, and the like. The content of the other polymeric materials is preferably 20 parts by weight or less, more preferably 10 parts by weight or less, and further preferably 5 parts by weight or less per 100 parts by weight of the polyamide-based resin constituting the polyamide-based resin beads, and it is particularly preferable not to contain the other polymeric materials other than the polyamide-based resin.

The content of the polyamide-based resin in the resin component constituting the polyamide-based resin beads is 50% by weight or more. From the viewpoint of obtaining polyamide-based resin expanded beads excellent in heat resistance, abrasion resistance, and chemical resistance, the content of the polyamide-based resin in the resin component constituting the polyamide-based resin beads is preferably 70% by weight or more, more preferably 80% by weight or more, and further preferably 90% by weight or more, and it is particularly preferable that the resin component constituting the polyamide-based resin beads is composed only of the polyamide-based resin.

To the polyamide-based resin beads, in addition to the polyamide-based resin, typically used various additives such as a cell controlling agent, a terminal blocking agent, an antistatic agent, a conductivity imparting agent, a weathering agent, a lubricant, an antioxidant, a UV absorber, a flame retardant, a metal deactivator, a colorant (pigment, dye, etc.), a crystal nucleating agent, and a filler can be appropriately added as necessary. Examples of the cell controlling agent include inorganic cell controlling agents such as talc, sodium chloride, calcium carbonate, silica, titanium oxide, gypsum, zeolite, borax, aluminum hydroxide, alum, and carbon, and organic cell controlling agents such as phosphoric acid-based compounds, amine-based compounds, and polytetrafluoroethylene (PTFE). The addition amount of these various additives varies depending on the intended use of the molded article, but is preferably 25 parts weight or less per 100 parts by weight of the resin component constituting the polyamide-based resin beads. The addition amount is more preferably 15 parts by weight or less, further preferably 10 parts by weight or less, and still more preferably 5 parts by weight or less.

The polyamide-based resin beads may be single layer resin beads or may be multilayer resin beads having a multilayer structure. The multilayer structure refers to a structure including a core layer and a covering layer covering the core layer, in which the core layer and the covering layer are composed of a polyamide-based resin having different properties. The multilayer resin beads are expanded in a second preparation step described later to become expanded beads having a foamed core layer and a covering layer covering the core layer. The covering layer is preferably substantially non-foamed. The "substantially non-foamed" means having little cell structure. When the polyamide-based resin beads are the multilayer resin beads, the melting point of the polyamide-based resin constituting the covering layer is preferably lower than the melting point (Tmc) of the polyamide-based resin constituting the core layer, and more preferably lower than the melting point (Tmc) by 20° C. or more. This provides polyamide-based resin expanded beads that can be molded in a mold with lower pressure molding steam while maintaining high heat resistance.

Next, the second preparation step will be described. The second preparation step includes a step of impregnating the polyamide-based resin beads prepared in the first preparation step with a blowing agent to obtain expandable polyamide-based resin beads, and a step of foaming the expandable polyamide-based resin beads. The foaming in the second preparation step may be referred to as one-stage foaming, and the expanded beads obtained thereby may be referred to as one-stage expanded beads.

In the step of impregnating the polyamide-based resin beads with a blowing agent to obtain expandable polyamide-based resin beads, the method for impregnating the polyamide-based resin beads with the blowing agent is not particularly limited, but it is preferable to disperse the polyamide-based resin beads in a dispersion medium in a pressurizable sealed container such as an autoclave and impregnate the polyamide-based resin beads with the blowing agent. From the viewpoint of shortening impregnation time of the blowing agent, the impregnation of the blowing agent into the polyamide-based resin beads is preferably performed while being pressurized and heated.

As the blowing agent, a physical blowing agent can be used. Examples of the physical blowing agent include, as organic physical blowing agents, aliphatic hydrocarbons such as propane, butane, pentane, hexane, and heptane, alicyclic hydrocarbons such as cyclopentane and cyclohexane, halogenated hydrocarbons such as chlorofluoromethane, trifluoromethane, 1,1-difluoroethane, 1,1,1,2-tetrafluoroethane, methyl chloride, ethyl chloride, and methylene chloride, dialkyl ethers such as dimethyl ether, diethyl ether, and methyl ethyl ether, and the like. In addition, examples of the physical blowing agent also include, as inorganic physical blowing agents, carbon dioxide, nitrogen, helium, argon, air, and the like.

Among the physical blowing agents, inorganic physical blowing agents are preferable, carbon dioxide or air is more preferable, and carbon dioxide is further preferable from the viewpoints of having less impact on the environment, not being flammable, and being superior in safety.

As the dispersion medium (specifically, liquid), an aqueous dispersion medium is used. Examples of the aqueous dispersion medium include water, thylene glycol, glycerin, methanol, ethanol, and the like. Among them, water is preferable as the dispersion medium.

Subsequently, the expandable polyamide-based resin beads impregnated with a blowing agent are expanded.

The method for forming the expandable polyamide-based resin beads is not particularly limited, and examples thereof include a direct foaming method, an impregnation foaming method, and the like. The direct foaming method is a method in which the polyamide-based resin beads are impregnated with a blowing agent in a sealed container in the above step to obtain expandable polyamide-based resin beads, and then the expandable polyamide-based resin beads are released together with a dispersion medium such as water to a lower pressure than the sealed container (usually an atmospheric pressure) to expand by opening one end of the sealed container. The impregnation foaming method is a method in which expandable polyamide-based resin beads obtained by the step of impregnating the polyamide-based resin beads with a blowing agent to obtain expandable polyamide-based resin beads are taken out without being foamed, and are heated and foamed with hot air or the like using another foaming device. The direct foaming method is particularly preferable from the viewpoint that it is easy to uniformly adjust the temperature of the dispersion medium in the sealed container.

In the production of the polyamide-based resin expanded beads by the direct foaming method, usually, the polyamide-based resin expanded beads released from the sealed container and expanded in consideration of handleability of the expanded beads and the like are then dried in a drying step. The polyamide-based resin expanded beads used in the present invention may be obtained by performing the drying step, or may be obtained without performing the drying step.

Water Containing Step

In the production method of the present invention, since the polyamide-based resin expanded beads in a wet state having a water content of 1% or more are used, when the polyamide-based resin expanded beads obtained as described above are used, the water containing step is appropriately performed to prepare the polyamide-based resin expanded beads in a wet state having a water content of 1% or more. The water containing step may be performed before the polyamide-based resin expanded beads are placed into a pressure-resistant container, or may be performed in a pressure-resistant container after the polyamide-based resin expanded beads are placed into the pressure-resistant container.

The water containing step may be a method capable of adjusting the water content of the polyamide-based resin expanded beads to a desired range. Examples of the water containing step include the following first water containing method, second water containing method, third water containing method, fourth water containing method, and fifth water containing method. The first water containing method is a water containing step of exposing the polyamide-based resin expanded beads to a standard state (for example, atmospheric pressure, humidity 50%, temperature 23° C.) for 12 hours or more, and preferably 24 hours or more. The second water containing method is a water containing step of exposing the polyamide-based resin expanded beads to a high temperature and high humidity state (for example, humidity 80% and temperature 40° C.) for 3 hours or more, and preferably 5 hours or more. The third water containing method is a water containing step of immersing the polyamide-based resin expanded beads in water and allowing to stand for about 1 minute to 4 hours. The fourth water containing method is a water containing step of putting the polyamide-based resin expanded beads in a bag, a container or the like together with water, and manually or mechanically stirring or mixing the polyamide-based resin expanded beads and water. The fifth water containing method is a water containing step of applying water to the polyamide-based resin expanded beads by a shower, an atomizer or the like. These water containing steps can also be carried out in combination. Since polyolefin-based resins and amide-based elastomers have low hygroscopicity, it is usually difficult to achieve a wet state having a water content of 1% or more depending on these water containing methods.

According to these water containing methods, it is possible to adjust the water content of the polyamine-based resin expanded beads to a desired range while suppressing variations in the water content for each expanded bead. As a result, in the internal pressure applying step described later, the internal pressure of the expanded beads can be made more uniform, and a group of multi-stage expanded beads having small variations in size can be obtained.

The first water containing method is suitable for obtaining polyamide-based resin beads having a water content of about 1% to 4%. Also, the second water containing method, the third water containing method, and the fourth water containing method are suitable for obtaining polyamide-based resin beads having a water content of 4% or more, or 4.5% or more. In addition, from the viewpoint of obtaining expanded beads with a uniform water content in a shorter time, the second water containing method is preferable.

In the first water containing method and the second water containing method, exposing the polyamide-based resin expanded beads to a standard state and a high temperature and high humidity state refers to a state in which the expanded beads are directly or indirectly exposed under the respective conditions. For example, the exposing includes any state where the polyamide-based resin expanded beads are stored in an open container, bag, tray, or the like in a room maintained under a predetermined condition, and the polyamide-based resin expanded beads are stored in a closed but unsealed container, bag, or the like.

Internal Pressure Applying Step

Next, the internal pressure applying step will be described.

The internal pressure applying step is a step of impregnating polyamide-based resin expanded beads with a physical blowing agent at a temperature higher than change-point temperature of storage modulus of the polyamide-based resin expanded beads in a wet state having a water content of 1% or more in a pressure-resistant container to apply an internal pressure higher than atmospheric pressure.

Water Content of Polyamide-Based Resin Expanded Beads

The polyamide-based resin expanded beads in a wet state having a water content of 1% or more used in the internal pressure applying step are prepared by, for example, the pre-step and the water containing step performed as necessary described above. In the present invention, the water content of the polyamide-based resin expanded beads can be measured using a Karl Fischer moisture meter. Specific examples of the measuring device include a trace moisture content measuring device (AQ-2200A) manufactured by HIRANUMA Co., Ltd., which measures the water content based on the Karl Fischer Coulometry.

Specifically, the water content of the polyamide-based resin expanded beads can be measured by the following method. First, about 0.2 g of polyamide-based resin expanded beads are weighed and used as a test piece. Subsequently, the moisture inside the test piece is vaporized by heating the test piece to a temperature of 160° C. using a heating vaporizer (for example, an automatic heating vaporizer SE320 manufactured by HIRANUMA Co., Ltd.). The moisture is guided to the Karl Fischer moisture measuring device connected to the heating vaporizer, the moisture amount is measured, and the water content of the expanded beads is calculated. As measurement conditions (titration conditions), waiting time: 40 seconds, electrolytic current: MEDIUM, and minimum electrolysis amount: 5 μg can be adopted.

In multi-stage foaming of polypropylene-based resin expanded beads and the like, usually, expanded beads in a dry state having a water content of 0.1% or less are placed into a pressure-resistant container and impregnated with a blowing agent at a temperature around normal temperature to apply internal pressure. However, in the production method of the present invention, unlike such a general production method, the polyamide-based resin expanded beads in a wet state having a water content of 1% or more are impregnated with a physical blowing agent to produce polyamide-based resin multi-stage expanded beads.

When polyamide-based resin expanded beads in a dry state having a water content of less than 1% were impregnated with a physical blowing agent, heating under a condition of a high temperature significantly higher than normal temperature or heating for a long time was required in order to sufficiently impregnate the polyamide-based resin expanded beads with the blowing agent.

The higher the water content of the polyamide-based resin expanded beads, the lower the change-point temperature of storage modulus, therefore, the polyamide-based resin expanded beads can be impregnated with the physical blowing agent at a lower temperature, or the time for maintaining the temperature and impregnating the expanded beads with the physical blowing agent can be shortened. From such a viewpoint, the water content of the polyamide-based resin expanded beads in a wet state is preferably 3.0% or more, more preferably 4.5% or more, and further preferably 5.0% or more.

On the other hand, the upper limit of the water content is not particularly defined. However, as shown in FIG. 1, when the water content increases, the degree of lowering of the change-point temperature of storage modulus decreases and the equilibrium state is reached, and thus the upper limit of the water content is approximately 20%. In addition, the upper limit of the water content is preferably 18% or less, and more preferably 15% or less from the viewpoint of filling properties when the resulting multi-stage expanded beads are in-mold molded.

The reason why the lower the change-point temperature of storage modulus as the higher the water content of the polyamide-based resin expanded beads is considered that molecular motion of the polyamide-based resin changes as the intermolecular interaction due to hydrogen bonding between molecules of the polyamide-based resin is weakened due to the presence of water molecules.

Regarding Temperature in Internal Pressure Applying Step

Next, the temperature in the internal pressure applying step will be described. In the internal pressure applying step, the temperature in the pressure-resistant container in the internal pressure applying step is adjusted to be higher than the change-point temperature of storage modulus of the polyamide-based resin expanded beads in a wet state. In addition, from the viewpoint of more efficiently applying an internal pressure to the expanded beads, it is preferable to adjust the temperature in the pressure-resistant container in the internal pressure applying step to be higher than the change-point temperature of storage modulus of the polyamide-based resin expanded beads in a wet state for a time exceeding 50% of the entire execution time of the internal pressure applying step. Here, the entire execution time of the internal pressure applying step refers to a time from the start of the internal pressure applying step to a time when the polyamide-based resin expanded beads to which internal pressure is applied are taken out. In the present invention, the start of the internal pressure applying step refers to the first time point when the state in which the water content of the polyamide-based resin expanded beads placed into the pressure-resistant container is 1% or more and the state in which the physical blowing agent is injected into the pressure-resistant container are satisfied. Note that either the time point when the water content of the polyamide-based resin expanded beads reached 1% or more or the time point when the physical blowing agent was injected into the pressure-resistant container may precede. Specifically, the internal pressure applying step may be started by charging the polyamide-based resin expanded beads having a water content of 1% or more into the pressure-resistant container, and then injecting the physical blowing agent. In addition, the internal pressure applying step may be started by charging the polyamide-based resin expanded beads having a water content of less than 1% into the pressure-resistant container, followed by injecting the physical blowing agent, and then subjecting the polyamide-based resin expanded beads in the pressure-resistant container to a treatment for increasing the water content of the polyamide-based resin expanded beads to 1% or more at an arbitrary timing.

Furthermore, the time exceeding 50% of the entire execution time of the internal pressure applying step may be a continuous time in the entire execution time, or may be a sum of intermittent times.

The present invention includes, for example, an aspect in which the internal pressure applying step is started from a temperature lower than the change-point temperature of storage modulus of the polyamide-based resin expanded beads in a wet state at the start of the internal pressure applying step, and the temperature in the pressure-resistant container is adjusted to a temperature higher than the change-point temperature of storage modulus of the polyamide-based resin expanded beads at that time at any timing of the internal pressure applying step.

From the viewpoint of more sufficiently applying the internal pressure, the time for adjusting the temperature in the pressure-resistant container to be higher than the change-point temperature of storage modulus of the polyamide-based resin expanded beads in a wet state in the internal pressure applying step is more preferably 70% or more, further preferably 80% or more, particularly preferably 90% or more, and most preferably substantially 100% of the entire execution time of the internal pressure applying step.

The temperature in the pressure-resistant container for a time exceeding 50% of the entire execution time of the internal pressure applying step described above may be adjusted to be constant or may be varied. During the internal pressure applying step, the change-point temperature of storage modulus of the polyamide-based resin expanded beads changes with a change in the water content. Therefore, the change-point temperature of storage modulus of the polyamide-based resin expanded beads, which serves as an index for determining the temperature in the pressure-resistant container described above, refers to the change-point temperature of storage modulus measured by taking out the polyamide-based resin expanded beads having a water content in the pressure-resistant container at that time and using the expanded beads.

As described above, the change-point temperature of storage modulus of the polyamide-based resin expanded beads in a wet state is lower than that in a dry state. Therefore, it can be impregnated with the physical blowing agent at a lower temperature or in a shorter time than in the case of using the polyamide-based resin expanded beads in a dry state. As a result, the load applied to a device such as the pressure-resistant container can be reduced, and the productivity is improved. In addition, it is possible to suppress a decrease in the closed cell content of the resulting polyamide-based resin multi-stage expanded beads, discoloration associated with deterioration of the resin, and the like.

The range of the temperature in the internal pressure applying step is not particularly limited, but it is preferable to impregnate the polyamide-based resin expanded beads in a wet state with the physical blowing agent at a temperature 30° C. or more higher than the change-point temperature of storage modulus of the polyamide-based resin expanded beads in a wet state at the start or the internal pressure applying step. This makes it possible to significantly shorten the impregnation time of the physical blowing agent and to apply a higher internal pressure.

In addition, during the internal pressure applying step, the water content of the polyamide-based resin expanded beads in a wet state in the pressure-resistant container gradually decreases, and the change-point temperature of storage modulus may be higher than that at the start of the internal pressure applying step. In response to this, by setting the temperature at which the physical blowing agent is impregnated to a temperature 30° C. or more higher than the change-point temperature of storage modulus of the polyamide-based resin expanded beads in a wet state at the start of the internal pressure applying step, the internal pressure of the polyamide-based resin expanded beads can be increased without any particular problem even when the change-point temperature increases during the impregnation with the physical blowing agent. From such a viewpoint, the temperature in the internal pressure applying step is more preferably a temperature 35° C. or more higher, further preferably a temperature 40'C or more higher, particularly preferably a temperature 45° C. or more higher, and most preferably a temperature 50° C. or more higher than the change-point temperature of storage modulus of the polyamide-based resin expanded beads in a wet state at the start of the internal pressure applying step. On the other hand, from the viewpoint of reducing the load applied to a device such as the pressure-resistant container, the temperature in the internal pressure applying step is preferably a temperature which is 80° C. higher than the change-point temperature of storage modulus of the polyamide-based resin expanded beads in a wet state at the start of the internal pressure applying step or less, more preferably a temperature which is 70° C. higher than the change-point temperature of storage modulus of the polyamide-based resin expanded beads in a wet state at the start of the internal pressure applying step or less, further preferably a temperature which is 60° C. higher than the change-point temperature of storage modulus of the polyamide-based resin expanded beads in a wet state at the start of the internal pressure applying step or less.

For a time exceeding 50% of the entire execution time of the internal pressure applying step, as the temperature in the pressure-resistant container in the internal pressure applying step, it is preferable that the physical blowing agent is impregnated at a temperature 30° C. or more higher than the change-point temperature of storage modulus of the polyamide-based resin expanded beads in a wet state at the start of the internal pressure applying step. For example, when the change-point temperature of storage modulus of the polyamide-based resin expanded beads in a wet state at the start of the internal pressure applying step is −10° C., the temperature in the pressure-resistant container in the internal pressure applying step is preferably maintained at a temperature of 20° C. or more for a time exceeding 50% of the entire execution time of the internal pressure applying step.

In the present invention, at the initial phase of the internal pressure applying step, the temperature in the pressure-resistant container is more preferably adjusted to be higher than the change-point temperature of storage modulus of the polyamide-based resin expanded beads in a wet state. Here, the initial phase of the internal pressure applying step refers to a time point until 5% elapse from the start, preferably a time point until 3% elapse, more preferably a time point until 1% elapse, and most preferably a time point at which the internal pressure applying step starts, of the entire execution time of the internal pressure applying step.

Furthermore, it is more preferable that the physical blowing agent is started to be impregnated at a temperature 30° C. or more higher than the change-point temperature of storage modulus of the polyamide-based resin expanded beads in a wet state at the start of the internal pressure applying step from the initial phase of the internal pressure applying step, and the temperature 30° C. or more higher than the change-point temperature is continuously maintained until the final phase of the internal pressure applying step. Here, the final phase of the internal pressure applying step refers to a time point from 95% elapse to 100% elapse from the start, preferably a time point from 97% elapse to 100% elapse, and more preferably a time point from 99% elapse to 100% elapse, of the entire execution time of the internal pressure applying step.

The absolute value of the upper limit of the temperature in the internal pressure applying step is not particularly specifically specified, and can be determined in view of other conditions such as the water content and the impregnation time of the physical blowing agent. However, from the viewpoint of reducing the load applied to the device and suppressing a decrease in the closed cell content of the polyamide-based resin multi-stage expanded beads, discoloration associated with deterioration of the resin, and the like, the temperature at the time of impregnation with the physical blowing agent in the internal pressure applying step is preferably 150° C. or less, more preferably 120° C. or less, further preferably 100° C. or less, still more preferably 80° C. or less, particularly preferably 50° C. or less, and most preferably 30° C. or less.

In the present invention, the change-point temperature of storage modulus refers to a change-point temperature of storage modulus (glass transition temperature obtained from a curve between temperature and storage modulus) obtained by measuring dynamic viscoelasticity measurement (DMA) of polyamide-based resin expanded beads in accordance with JIS K7095: 2012.

Figure 2:
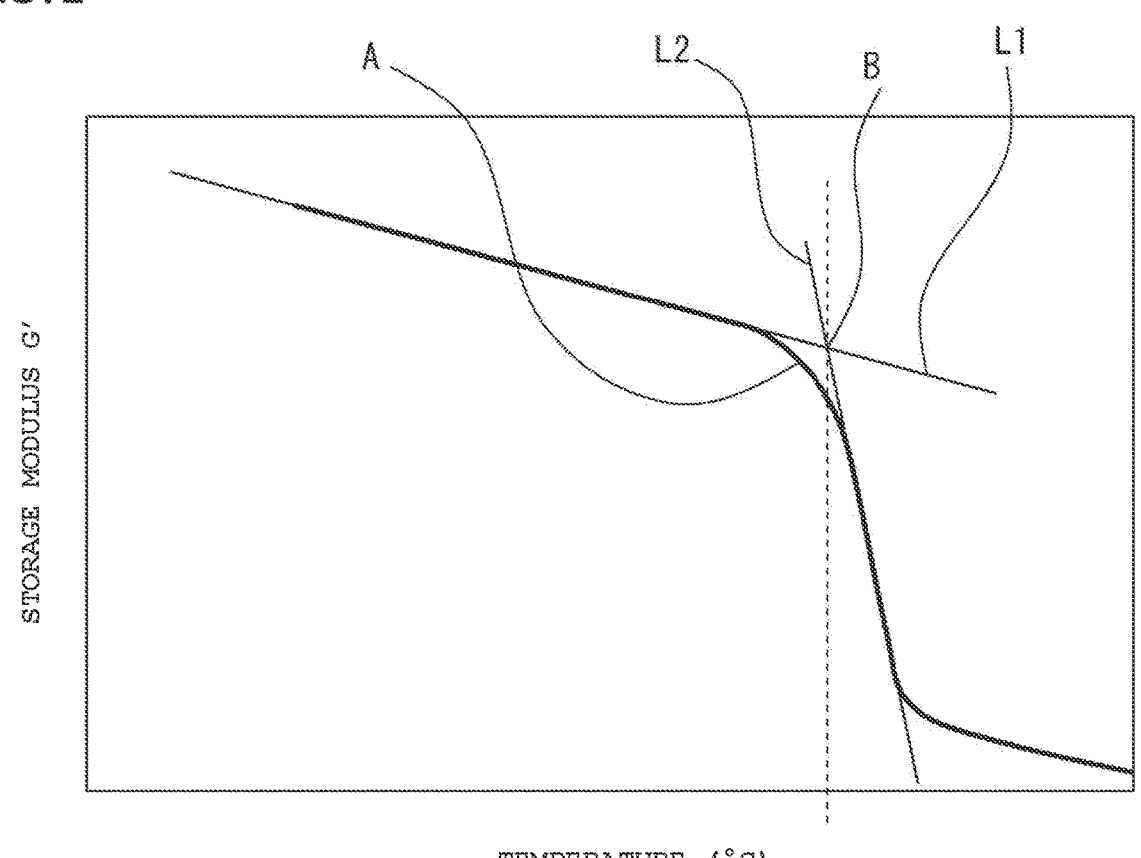
FIG. 2 is a graph exemplarily showing relationship between storage modulus and temperature of polyamide-based resin expanded beads measured after a model of JIS K7095: 2012.

Specifically, one expanded bead of which the water content has been adjusted in advance is fixed with a jig, and the storage modulus is measured by raising the temperature from −50° C. to 150° C. at a temperature rising rate of 2° C./min in a compression mode and at a constant frequency (1 Hz). Then, as shown in FIG. 2, a graph is created by plotting the measurement results with the storage modulus on the vertical axis and the temperature on the horizontal axis. FIG. 2 is a graph exemplarily showing the relationship between the storage modulus and the temperature of the polyamide-based resin expanded beads measured after a model of JIS K7095: 2012. As the DMA measurement device, for example, DMA7100 manufactured by Hitachi High-Tech Science Corporation can be used.

In the above graph, a temperature indicated by a perpendicular line drawn downward from intersection B of extended line L1 obtained by extending a straight line before the first rapid decrease of the storage modulus to the high temperature side and extended line L2 obtained by extending a straight line of an intermediate line after the first rapid decrease of the storage modulus to the low temperature side is defined as the change-point temperature of storage modulus. When a plurality of change-point temperatures of storage modulus appear, a change-point temperature on the lowest temperature side is adopted. The measurement is performed on 10 expanded beads, and the arithmetic average value thereof is defined as the change-point temperature of storage modulus of the polyamide-based resin expanded beads.

Incidentally, according to the measurement of dynamic viscoelasticity measurement (DMA), the loss modulus and the loss tangent can be obtained in addition to the storage modulus. Among these physical property values, the change-point temperature of storage modulus is considered to be the lowest temperature at which the molecular motion of the measured resin material starts to change (the elastic modulus changes). Therefore, in the present invention, it is considered that the change-point temperature of storage modulus can be applied as an index of the lower limit temperature at which the internal pressure can be applied to the polyamide-based resin expanded beads.

When it is difficult to measure the storage modulus in dynamic viscoelasticity measurement of the polyamide-based resin expanded beads, or when the measured value varies greatly, the storage modulus can be measured by the following method. First, in a plurality of polyamide-based resin expanded beads composed of a polyamide-based resin of the same type as the polyamide-based resin expanded beads, relationship between the water content of the polyamide-based resin expanded beads and the change-point temperature of storage modulus in the measurement is plotted. Next, a relational expression between the water content and the change point of storage modulus is obtained from this plot. Then, the change-point temperature of storage modulus can also be determined by performing calculation using the relational expression from the value of the water content of the expanded beads whose storage modulus is difficult to measure.

Pressure in Internal Pressure Applying Step

Next, the pressure in the pressure-resistant container in the internal pressure applying step will be described. The pressure inside the pressure-resistant container into which the polyamide-based resin expanded beads in a wet state are placed is increased by injecting the physical blowing agent. As a result, the polyamide-based resin expanded beads in a wet state are impregnated with the physical blowing agent, and the internal pressure is applied to the polyamide-based resin expanded beads in a wet state. The injection of the physical blowing agent and the temperature rise in the pressure-resistant container may be started at the same time, or either one may be started first. In addition, first, the temperature rise may be started, and the injection may be started after a predetermined temperature is reached.

The pressure increase rate of the pressure in the pressure-resistant container is not particularly limited, but the polyamide-based resin expanded beads in a wet state are softened as compared with those before moisture absorption. Therefore, it is preferable to inject the physical blowing agent into the pressure-resistant container at a speed in the range of 0.01 MPa/hr or more and 0.2 MPa/hr or less from the viewpoint of suppressing collapse of the expanded beads due to rapid pressure increase, the viewpoint of reducing the load on the device, the viewpoint of reducing the time required for applying the internal pressure, and the like.

In a general method for producing polyamide-based resin expanded beads, a physical blowing agent is generally injected at a pressure increase rate not exceeding 0.01 MPa/hr in consideration of the high gas barrier property of the polyamide-based resin. However, since the polyamide-based resin expanded beads having a reduced gas barrier property by being in a wet state are used in the internal pressure applying step in the present invention, it is possible to sufficiently impregnating the polyamide-based resin expanded beads with the physical blowing agent even at the pressure increase rate described above to apply internal pressure.

The final pressure in the pressure-resistant container is not particularly limited, but is preferably in the range of 0.2 MPa (G) or more and 2.0 MPa (G) or less, and more preferably in the range of 0.3 MPa (G) or more and 1.0 MPa (G) or less.

Examples of the physical blowing agent used in the internal pressure applying step include the same physical blowing agents as those described in the second preparation step. Among them, an inorganic physical blowing agent is preferable, and carbon dioxide or air is more preferable.

By adjusting temperature and pressure increasing conditions to be appropriately adjusted in the pressure-resistant container and the like, the polyamide-based resin expanded beads in a wet state are impregnated with the physical blowing agent to apply internal pressure exceeding atmospheric pressure (that is, 0 MPa (G)). By using the polyamide-based resin expanded beads to which internal pressure is applied in the heating and foaming step described later, polyamide-based resin multi-stage expanded beads having a small apparent density can be produced. From the viewpoint of easily obtaining polyamide-based resin multi-stage expanded beads having a lower apparent density, the internal pressure is preferably 0.1 MPa (G) or more, more preferably 0.15 MPa (G) or more, and further preferably 0.2 MPa (G) or more.

On the other hand, the upper limit of the internal pressure is not particularly limited, but is approximately 2 MPa (G) or less, and preferably 1 MPa (G) or less in view of performance of the pressure-resistant container and economic balance.

In the internal pressure applying step, it is preferable to impregnate the polyamide-based resin expanded beads with the physical blowing agent so that the internal pressure increase rate of the polyamide-based resin expanded beads in a wet state is the range of 0.003 MPa/hr or more and 0.05 MPa/hr or less. This makes it possible to apply a high internal pressure to the polyamide-based resin expanded beads in a short time as compared with the conventional case. In other words, when the polyamide-based resin expanded beads in a dry state are used, the gas barrier property is high, thus it has been difficult to apply the internal pressure at the above-described high speed unless the temperature is set to a high temperature. However, in the present invention, since the polyamide-based resin expanded beads in a wet state having a low gas barrier property are used, a high internal pressure can be applied within a shortened time, and the productivity is excellent. From such a viewpoint, the internal pressure increase rate is more preferably 0.005 MPa/hr or more.

The internal pressure increase rate of the polyamide-based resin expanded beads is calculated by subtracting the internal pressure (MPa (G)) of the polyamide-based resin expanded beads in a wet state before the internal pressure is applied from the internal pressure (MPa (G)) of the polyamide-based resin expanded beads obtained in the internal pressure applying step, and dividing the resulting value by pressurization time required to obtain the internal pressure. The internal pressure increase rate of the expanded beads in a wet state is not necessarily a constant value in the internal pressure applying step, and means an average value of the ratio of the internal pressure (MPa (G)) increasing per hour.

Internal pressure P of the polyamide-based resin expanded beads can be determined by the following method using the following formulas (1) and (2). The weight W7 of a small bag is measured in advance.

Specifically, first, an arbitrary amount polyamide-based resin expanded beads to which internal pressure is applied (wet pressurized expanded beads) are put in small bag from a group of polyamide-based resin expanded beads to which internal pressure is applied (a wet pressurized expanded beads group) taken out from the pressure-resistant container, and the weight W2 is measured.

Further, an arbitrary amount of sample is separately collected from the group of polyamide-based resin expanded beads (wet pressurized expanded beads group), and the water content in the sample is measured in advance with a Karl Fischer moisture meter. Moisture amount measured with a Karl Fischer moisture meter is defined as W6, and the amount of sample subjected to measurement with a Karl Fischer moisture meter is defined as W5.

The amount W3 of moisture contained in the wet pressurized expanded beads can be determined by dividing a value obtained by subtracting the weight W7 of the small bag from the weight W2 of the wet pressurized expanded beads by the amount W5 of sample measured by a Karl Fischer moisture meter, and multiplying the resulting value by the moisture amount W6 measured by a Karl Fischer moisture meter.

The weight W1 of dry pressurized expanded beads can be determined by subtracting a value obtained by adding the amount W3 of moisture in the wet pressurized expanded beads and the weight W7 of the bag obtained above from the weight W2 of the wet pressurized expanded beads.

Subsequently, the wet pressurized expanded beads are stored together with the small bag in a thermo-hygrostat at 80° C. under atmospheric pressure and allowed to stand for 48 hours to release the internal pressure. Then, the polyamide-based resin expanded beads whose pressure has been released are taken out from the thermo-hygrostat, and dried under the conditions of 160° C. and atmospheric pressure for 20 hours. Then, the weight W4 of the dried polyamide-based resin expanded beads (dried expanded beads) taken out from the small bag is measured, and the air amount Wa contained in the polyamide-based resin expanded beads to which internal pressure is applied is calculated by the following formula (1). The Karl Fischer moisture meter and measurement conditions are the same as those for the measurement of the water content of the polyamide-based resin expanded beads.

Whether the pressure of the polyamide-based resin expanded beads has been released can be confirmed by the fact that the weight of the beads has not decreased, but for example, the pressure can be sufficiently released by being stored in a thermo-hygrostat at 80° C. for a long time of about 48 hours.

[Mathematical formula 1]

$$
\begin{aligned}
\text{Air amount } Wa &= W1 - W4 \qquad\qquad (1)\\
&= (W2 - W3 - W7) - W4\\
&= \left[ W2 - ((W2 - W7) \times W6/W5) - W7 \right] - W4
\end{aligned}
$$

W1: Weight (g) of dry pressurized expanded beads

W2: Weight (g) of wet pressurized expanded beads weight with weight of small bag W3: Amount (g) of moisture in wet pressurized expanded beads W4: Weight (g) of dry expanded beads W5: Amount (g) of sample subjected to measurement with Karl Fischer moisture meter W6: Moisture amount (g) measured by Karl Fischer moisture meter W7: Weight (g) of small bag Wa: Air amount (g)

The internal pressure of the polyamide-based resin expanded beads to which the internal pressure P is applied can be determined using the air amount Wa (g) determined as described above in the following formula (2).

[Mathematical formula 2]

$$
\text{Internal pressure P ((MPa (G)} = [(Wa \times 0.00831 \times 296)/28.8]/[(W4/\text{Apparent density of expanded beads (g/L)}) - (W4/\text{Density of resin (g/L)})] \qquad (2)
$$

The internal pressure P (MPa (G)) of the polyamide-based resin expanded beads measured by the above method corresponds to a gauge pressure. The gauge pressure is a value obtained by subtracting the atmospheric pressure from the absolute pressure.

From the viewpoint that the internal pressure applied to the polyamide-based resin expanded beads is less likely to be released after performing the internal pressure applying step and before the heating and foaming step, it is desirable that the change-point temperature of storage modulus of the polyamide-based resin expanded beads to which internal pressure is applied, obtained in the internal pressure applying step, be higher than the change-point temperature of storage modulus of the polyamide-based resin expanded beads in a wet state used in the internal pressure applying step. As a result, the gas barrier property of the polyamide-based resin expanded beads to which internal pressure is applied is enhanced, and the impregnated physical blowing agent is held inside the expanded beads, whereby polyamide-based resin multi-stage expanded beads having a higher expansion ratio can be produced in the heating and foaming step in the next step.

From such a viewpoint, the difference [(A)−(B)] between the water content (A) of the polyamide-based resin expanded beads in a wet state used in the internal pressure applying step and the water content (B) of the polyamide-based resin expanded beads to which internal pressure is applied, obtained by the internal pressure applying step, is preferably 0.5% or more, more preferably 1% or more, further preferably 2% or more, and particularly preferably 3% or more.

The value of the water content (B) of the polyamide-based resin expanded beads to which internal pressure is applied, obtained in the internal pressure applying step, is preferably 10% or less, more preferably 8% or less, and further preferably 6% or less from the viewpoint that the applied internal pressure is less likely to be released and multi-stage expanded beads having a low apparent density are more stably produced.

The water content (B) of the polyamide-based resin expanded beads to which internal pressure is applied, obtained in the internal pressure applying step, can be adjusted by changing the time, temperature, temperature rising rate, pressure, pressure increase rate, and the like of the internal pressure applying step.

The polyamide-based resin expanded beads for multi-stage foaming are provided by the internal pressure applying step. That is, "polyamide-based resin expanded beads for multi-stage foaming having an internal pressure higher than atmospheric pressure obtained by impregnating polyamide-based resin expanded beads in a wet state having a water content of 1% or more with the physical blowing agent at a temperature higher than a change-point temperature of storage modulus of the polyamide-based resin expanded beads in a wet state" are provided.

Heating and Foaming Step

After the internal pressure applying step described above, the heating and foaming step is quickly performed. The heating and foaming step is a step of heating and foaming the polyamide-based resin expanded beads to which internal pressure is applied obtained in the internal pressure applying step to obtain polyamide-based resin multi-stage expanded beads having an apparent density lower than that of the polyamide-based resin expanded beads used in the internal pressure applying step.

In the heating and foaming step, the "apparent density of the polyamide-based resin expanded beads used in the internal pressure applying step" means the apparent density of the polyamide-based resin expanded beads before the water containing step is performed, obtained in the second preparation step. That is, in the present invention, the apparent density of the polyamide-based resin expanded beads refers to the apparent density measured using sufficiently dried polyamide-based resin expanded beads.

More specifically, the polyamide-based resin expanded beads to which internal pressure is applied are charged into a container and heated and foamed. The heating and foaming step may be performed under pressure. The pressure in this case is not particularly limited, but may be adjusted in a range of, for example, about 0.03 MPa or more and 0.4 MPa or less.

As the heating method, a heating method similar to the heating and foaming step known in the multi-stage foaming of the thermoplastic resin expanded beads can be appropriately adopted. Specifically, it is preferable to perform heating using, for example, steam or heated air as a heating medium, and it is more preferable to perform heating using steam. By using steam as the heating medium, the change-point temperature of storage modulus of the polyamide-based resin expanded beads to which internal pressure is applied can be lowered by moisture contained in the steam supplied into the container, and as a result, more highly foamed polyamide-based resin multi-stage expanded beads are easily obtained. The heating time can be, for example, in a range of 5 seconds or more and 120 seconds or less.

The heating temperature in the container in the heating and foaming step is not particularly limited, but it is preferable that the polyamide-based resin expanded beads to which internal pressure is applied, which are placed into a sealed container, are expanded by heating with a heating medium having a temperature higher than change-point temperature of storage modulus of the polyamide-based resin expanded beads to which internal pressure is applied and lower than melting point of the polyamide-based resin constituting the polyamide-based resin expanded beads to which internal pressure is applied. As a result, not only a high expansion ratio but also blocking between the expanded beads in the sealed container is avoided, and expanded beads having a high closed cell content and excellent moldability are easily obtained. The blocking means that the expanded beads are fused to each other to form a lump. From such a viewpoint, the temperature of the heating medium in the heating and foaming step is preferably 65° C. or more and 190° C. or less, more preferably 70° C. or more and 150° C. or less, and further preferably 75° C. or more and 120° C. or less. The melting point of the polyamide-based resin constituting the polyamide-based resin expanded beads to which internal pressure is applied in the heating and foaming step means a melting point inherent to the polyamide-based resin constituting the expanded beads.

Poly-Based Resin Multi-Stage Expanded Beads

By performing the internal pressure applying step and the heating and foaming step as described above, polyamide-based resin multi-stage expanded beads having a small apparent density can be produced. According to the production method of the present invention, for example, poly-amide-based resin multi-stage expanded beads having an apparent density of 100 kg/m³ or less can be obtained, and the apparent density can be further preferably adjusted to 85 kg/m³ or less, and more preferably 70 kg/m³ or less. This makes it possible to provide a molded article of polyamide-based resin expanded beads excellent in weight reduction. When the apparent density in the above range is not achieved by two-stage foaming, three-stage or more foaming may be further performed. In such a range, a molded article of polyamide-based resin expanded beads excellent in lightweight properties can be provided.

In the production method of the present invention, the apparent density of the polyamide-based resin multi-stage expanded beads obtained by the heating and foaming step is smaller than the apparent density of the polyamide-based resin expanded beads used in the internal pressure applying step, and in particular, polyamide-based resin multi-stage expanded beads having a large expansion ratio can be easily produced. In particular, from the viewpoint of obtaining polyamide-based resin multi-stage expanded beads more excellent in lightweight properties, the ratio of the apparent density of the polyamide-based resin multi-stage expanded beads to the apparent density of the polyamide-based resin expanded beads used in the internal pressure applying step is preferably 0.70 or less, more preferably 0.65 or less, further preferably 0.60 or less, and particularly preferably 0.55 or less.

Regarding the production method of the present invention, the apparent density of the polyamide-based resin expanded beads or the polyamide-based resin multi-stage expanded beads is measured by the following method.

A measuring cylinder containing water at a temperature of 23° C. is prepared, and the weight Wp of the expanded beads of about 500 cm³ left standing under conditions of a relative humidity of 50%, 23° C., and 1 atm for 2 days is measured, and the expanded beads are sunk in the measuring cylinder using a wire mesh. In consideration of the volume of the wire mesh, the volume Vp [cm$^3$] of the expanded beads read from water level rise is measured, the weight Wp [g] of the expanded beads is divided by the volume Vp (Wp/Vp), and the unit is converted into [kg/m$^3$], whereby the apparent density of the expanded beads can be obtained.

The polyamide-based resin expanded beads used in the internal pressure applying step of the present invention preferably contain a terminal blocking agent. In the heating and foaming step, the polyamide-based resin expanded beads to which internal pressure is applied are heated with a heating medium such as steam, and polyamide-based resin multi-stage expanded beads having a lower apparent density are produced. In this step, particularly when polyamide-based resin multi-stage expanded beads having a low apparent density, such as 100 kg/m$^3$ or less, were produced, moldability was easily deteriorated. By containing the terminal blocking agent in the polyamide-based resin expanded beads, hydrolysis of polyamide-based resin constituting the polyamide-based resin expanded beads in the heating and foaming step is suppressed, and as a result, moldability of the polyamide-based resin multi-stage expanded beads can be improved.

From the viewpoint of further improving the moldability of the polyamide resin multi-stage expanded beads, the content of the terminal blocking agent in the polyamide-based resin expanded beads used in the internal pressure applying step is preferably 0.1 parts by weight or more and 3.0 parts by weight or less, more preferably 0.3 parts by weight or more and 2.0 parts by weight or less, and further preferably 0.5 parts by weight or more and 1.5 parts by weight or less, per 100 parts by weight of the polyamide-based resin.

As the terminal blocking agent for blocking the molecular chain terminal of the polyamide-based resin, for example, a carbodiimide compound, an oxazoline compound, an isocyanate compound, an epoxy compound, or the like can be used. Among them, a carbodiimide compound is preferable. Specific examples thereof include aromatic monocarbodiimides such as bis(dipropylphenyl)carbodiimide (for example, "Stabaxol (registered trademark) 1-LF" manufactured by Rhein Chemie Corporation), aromatic polycarbodiimide (for example, "Stabaxol (registered trademark) P", "Stabaxol (registered trademark) P100", "Stabaxol (registered trademark) P400", and the like manufactured by Rhein Chemie Corporation), aliphatic polycarbodiimides such as poly(4, 4'-dicyclohexylmethanecarbodiimide) (for example, "CARBODILITE LA-1" manufactured by Nisshinbo Chemical Inc.), and the like. These terminal blocking agents may be used singly or two or more types thereof may be used in combination.

As described above, the polyamide-based resin used in the present invention is preferably a polyamide-based resin that is terminally blocked with one or more terminal blocking agents selected from a carbodiimide compound, an epoxy compound, an isocyanate compound, and the like, and more preferably a polyamide-based resin that is terminally blocked with a carbodiimide compound.

The closed cell content of the polyamide-based resin multi-stage expanded beads produced by the production method of the present invention is preferably 80% or more, more preferably 85% or more, and further preferably 90% or more. When the closed cell content satisfies the above range, the moldability of the expanded beads is improved, and the expanded beads molded article prepared by in-mold molding of the expanded beads tends to be excellent in secondary expansion property and fusion-bonding property.

The closed cell content is the ratio of the volume of closed cells to the volume of all cells in the expanded beads, and can be determined using an air-comparison pycnometer based on Procedure C described in ASTM-D2856-70.

Polyamide-Based Resin Expanded Beads Having High-Temperature Peak

Incidentally, the present applicant has conducted various studies in order to provide more excellent polyamide-based resin expanded beads, and has proposed polyamide-based resin expanded beads having a high-temperature peak that is not expressed in general polyamide-based resin expanded beads in a DSC curve obtained by heat flux differential scanning calorimetry (WO 2020/050301 A1). When the polyamide-based resin expanded beads exhibit such a high-temperature peak, the heat resistance and moldability of the expanded beads can be enhanced, and blocking between the expanded beads during foaming is suitably prevented.

Figure 3:
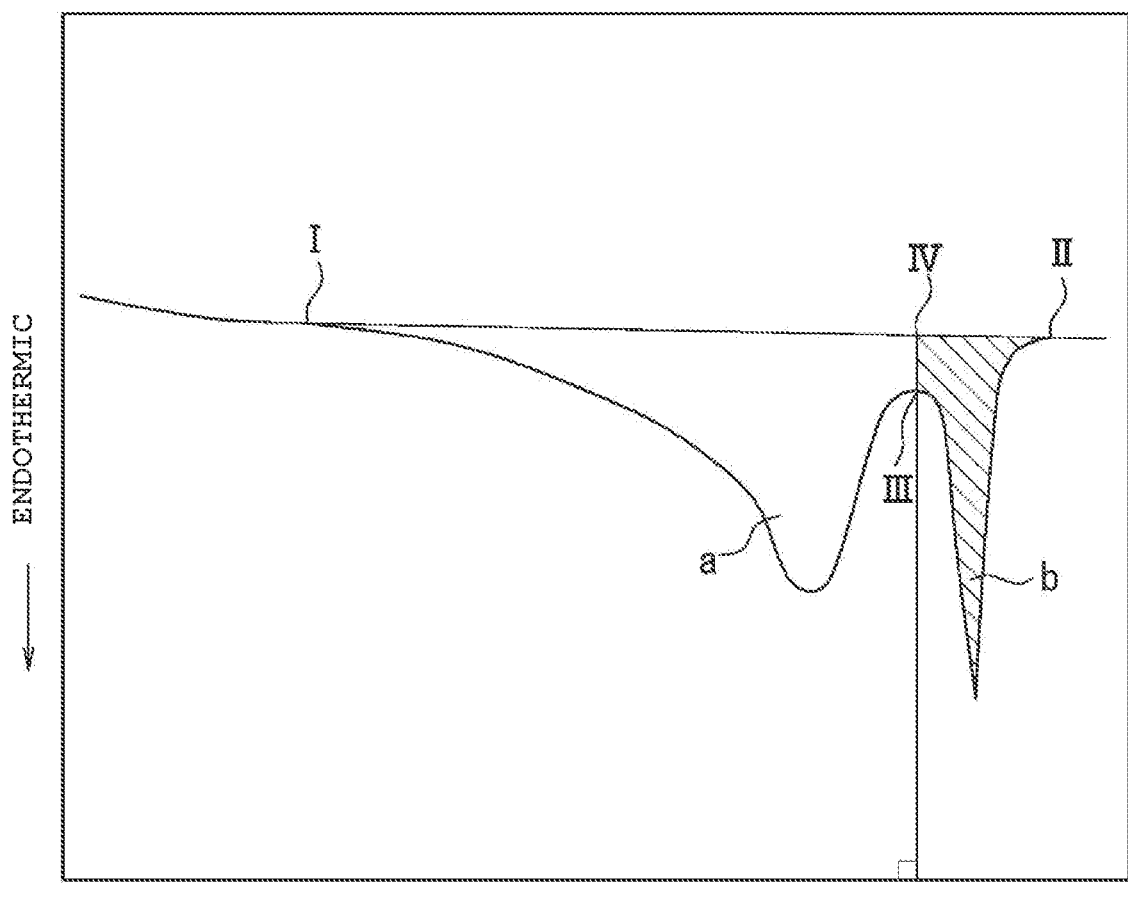
FIG. 3 is an example of a DSC curve of polyamide-based resin expanded beads measured based on heat flux differential scanning calorimetry.

Here, more specifically, as shown in FIG. 3, the high-temperature peak refers to a melting peak (high-temperature peak b) at which a peak top temperature appears on a higher temperature side than a melting peak (intrinsic peak a) inherent to the polyamide-based resin in the first DSC curve measured when the polyamide-based resin expanded beads are heated and melted from 30° C. to a temperature 30° C. higher than the end of the melting peak at a heating rate of 10° C./min by heat flux differential scanning calorimetry based on JIS K7122: 1987. FIG. 3 is an example of a DSC curve of the polyamide-based resin expanded beads measured based on heat flux differential scanning calorimetry. FIG. 3 shows an example in which one high-temperature peak b appears, but there may be two or more high-temperature peaks b.

From the viewpoint of enhancing the heat resistance and moldability of the expanded beads, the total heat of fusion of all the high-temperature peaks at which the peak top temperature appears on the higher temperature side than the peak top temperature of the intrinsic peak is preferably 5 J/g or more, more preferably 6 J/g or more, and further preferably, 7 J/g or more. In addition, the total heat of fusion of the high-temperature peak is preferably 50 J/g or less, more preferably 30 J/g or less, and further preferably 20 J/g or less. From the viewpoint of widening the moldable range, the total heat of fusion of the high-temperature peak is preferably 10 J/g or less, and further preferably 9 J/g or less. When two or more of the high-temperature peaks appear, the heat of fusion of the high-temperature peak means the total heat amount of all the high-temperature peaks.

On the other hand, the intrinsic peak a is a melting peak derived from a crystal structure inherent to the polyamide-based resin. The peak top temperature of the intrinsic peak a may be slightly different from the peak top temperature of the melting peak appearing in the second DSC curve described later, but the difference is usually within 5° C.

The second DSC curve refers to a DSC curve measured when the polyamide-based resin expanded beads after completion of the measurement of the first DSC curve are maintained at a temperature 30° C. higher than the end of the melting peak after the measurement of the first DSC curve for 10 minutes, then cooled to 30° C. at a cooling rate of 10° C./min, and heated and melted again to a temperature 30° C. higher than the end of the melting peak at a heating rate of 10° C./min. In the second DSC curve, only an endothermic peak due to melting inherent to the polypropylene-based resin constituting the expanded beads is observed, so that the resin intrinsic peak and the high-temperature peak can be distinguished.

A specific method for determining the heat of fusion of the high-temperature peak in the first DSC curve will be described in Examples.

The polyamide-based resin expanded beads exhibiting the high-temperature peak b can be obtained by adopting a direct foaming method as the second preparation step constituting the pre-step. Specifically, they are obtained by adjusting the temperature in a sealed container (expanding pot) in which the polyamide-based resin beads are dispersed to promote crystallization of the polyamide-based resin.

The temperature can be appropriately set within a range in which the above-described scope is achieved. For example, in the direct foaming method, when the temperature in the sealed container is raised from the temperature at the time of dispersion (initial temperature) to the temperature at the time of release (expanding temperature), a method of providing a heating and holding step of holding intermediate temperature at any intermediate temperature between the start temperature and the expanding temperature for a certain period of time is preferable. In the expanding step of performing at such a temperature, it is preferable to select an aqueous medium such as water as a dispersion medium to be added to the sealed container. By dispersing the polyamide-based resin beads in an aqueous medium to absorb water, the polyamide-based resin beads are plasticized, and the final expanding temperature can be set lower than that before plasticization.

The heating and holding step is preferably a step of holding the sealed container in which the polyamide-based resin beads are dispersed, at a temperature 90° C. lower than the melting point (Tm) of the polyamide-based resin (Tm−90° C.) or more and less than a temperature 50° C. lower than the melting point (Tm) of the polyamide-based resin (Tm−50° C.) for a holding time of 1 minute or more and 60 minutes or less. By including the step of holding under such conditions, the above-described high-temperature peak can be formed.

As described above, the polyamide-based resin expanded beads having a high-temperature peak can improve the heat resistance and moldability of the expanded beads, and blocking between the expanded beads is suitably prevented during foaming, but conventionally, there has been a problem that it is difficult to perform multi-stage foaming. That is, the polyamide-based resin expanded beads whose crystallization has been promoted so as to exhibit a high-temperature peak tend to have a higher gas barrier property than that of the polyamide-based resin expanded beads having no high-temperature peak, and there has been a circumstance that it is difficult for the polyamide-based resin expanded beads to be impregnated with the physical blowing agent at the time of multi-stage foaming.

On the other hand, in the production method of the present invention, the following effects are obtained by adjusting the water content of the polyamide-based resin expanded beads having a high-temperature peak to 1% or more and performing the internal pressure applying step and the heating and foaming step. That is, according to the present invention, even in the case of the polyamide-based resin expanded beads having a high-temperature peak, the change-point temperature of storage modulus of the expanded beads can be lowered, and the expanded beads can be easily impregnated with the physical blowing agent to apply a sufficient internal pressure. As a result, multi-stage expanded beads having a high-temperature peak and a low apparent density can be more easily produced.

As described above, in the present invention, as the polyamide-based resin expanded beads in a wet state, for example, polyamide-based resin expanded beads obtained by adjusting the water content of the one-stage expanded beads obtained by one-stage expansion to 1% or more by the water containing step can be used. The second stage foaming (two-stage foaming) can be performed by the production method of the present invention using such polyamide-based resin expanded beads.

In addition, as the polyamide-based resin expanded beads in a wet state, polyamide-based resin multi-stage expanded beads having a small apparent density having a water content of 1% or more obtained in the heating and foaming step can also be used. That is, the present invention is not limited to the implementation of the two-stage foaming, and the polyamide-based resin multi-stage expanded beads obtained by the implementation of the present invention and having a water content appropriately adjusted may be used as "the polyamide-based resin expanded beads in a wet state", and the production method of the present invention may be repeated to repeat three-stage foaming, four-stage foaming . . . . In order to achieve a lower apparent density, three or more stages of foaming can be performed.

When the polyamide-based resin multi-stage expanded beads obtained by two stage foaming are further provided for three-stage foaming, it is preferable to measure and grasp the change-point temperature of storage modulus of the polyamide-based resin multi-stage expanded beads provided for three-stage foaming by a preliminary experiment in advance.

A molded article of polyamide-based resin expanded beads (hereinafter, also simply referred to as a molded article) using the polyamide-based resin multi-stage expanded beads of the present invention described above can be produced. The production method is not particularly limited, and conventionally known methods can be adopted. For example, the in-mold molding method is preferable for producing the molded article. In particular, according to the in-mold molding method using steam, since the polyamide-based resin constituting the polyamide-based resin multi-stage expanded beads is plasticized by steam, the molding pressure at the time of in-mold molding can be reduced. The obtained molded article is excellent in lightweight properties, and can exhibit the original physical properties of the polyamide-based resin by drying, so that the molded article has high heat resistance.

In addition, in the in-mold molding method, a known method can be adopted as a method for filling the polyamide-based resin multi-stage expanded beads into a mold. A method of pressurizing the expanded beads with a pressurized gas in a range in which the secondary expansion force of the expanded beads is not excessively improved considering of the fusion-bonding property of the expanded beads molded article to apply a predetermined internal pressure to cells of the expanded beads and then filling the expanded beads in a mold, a method of filling the expanded beads in a pressurized mold in a state of being compressed with a pressurized gas and then releasing the pressure in the mold, a method of foaming a molding space by opening the mold in advance before filling the expanded beads in the mold and mechanically compressing the expanded beads by closing the mold after filling, and the like can be adopted. The molded article has high heat resistance, excellent abrasion resistance and chemical resistance, and the like, and also excellent fusion-bonding property and tensile strength.

Furthermore, the molded article obtained using the multi-stage expanded beads of the present invention is particularly excellent in lightweight properties. Therefore, the molded article can be favorably used as a packing material for automobile parts and electrical appliances, and the like.

EXAMPLES

Hereinafter, the present invention will be described in detail with reference to Examples, but the present invention is not limited thereto.

With respect to Examples and Comparative Examples described below, respective physical properties of the poly-amide-based resin expanded beads and the polyamide-based resin multi-stage expanded beads were measured by the following methods. Incidentally, the measurement method described in this paragraph is described as a measurement method related to the polyamide-based resin expanded beads, but any measurement method can be applied to each measurement of the polyamide-based resin multi-stage expanded beads.

Method for Measuring Apparent Density

A measuring cylinder containing water at a temperature of 23° C. was prepared, and the weight Wp of the polyamide-based resin expanded beads of about 500 cm³ left standing under conditions of a relative humidity of 50%, 23° C., and 1 atm for 2 days was measured, and the expanded beads were sunk in the measuring cylinder using a wire mesh. In consideration of the volume of the wire mesh, the volume Vp [cm³] of the polyamide-based resin expanded beads read from water level rise was measured, the weight Wp [g] of the expanded beads was divided by the volume Vp (Wp/Vp), and the unit was converted into [kg/m³] to determine the apparent density of the expanded beads.

Method for Measuring Heat of Fusion of High-Temperature Peak

The heat of fusion at the high-temperature peak of the polyamide-based resin expanded beads was determined from the area of the high-temperature peak in the first DSC curve obtained when the temperature was raised from 30° C. to a temperature 30° C. higher than the end of the melting peak at a heating rate of 10° C./min by heat flux differential scanning calorimetry. As the measuring device, a high-sensitive differential scanning calorimeter "EXSTAR DSC7020" (manufactured by SII NanoTechnology Inc.) was used.

The heat of fusion at the high-temperature peak of the expanded beads corresponds to the area of the high-temperature peak b appearing on the higher temperature side than the intrinsic peak a in the DSC curve shown in FIG. 3, and was determined as follows. First, as shown in FIG. 3, a straight line connecting point I at 150° C. on the DSC curve and point II indicating the end temperature of melting on the DSC curve was drawn. Next, the intersection of a straight line that passes point III on the DSC curve corresponding to a valley between the intrinsic peak a and the high-tempera-ture peak b and is perpendicular to the temperature of the horizontal axis of the graph and a straight line connecting the point I and the point II was defined as point IV. The area of a part surrounded by the straight line connecting the point IV and the point II, the straight line connecting the point III and the point IV, and the DSC curve connecting the point III and the point II (diagonal lines part) thus obtained was defined as the heat of fusion of the high-temperature peak.

Method for Measuring Closed Cell Content

The closed cell content is the ratio of the volume of closed cells to the volume of all cells in the polyamide-based resin expanded beads, and was determined using an air-compari-son pycnometer based on Procedure C described in ASTM-D2856-70.

Specifically, the closed cell content was determined as follows. Using expanded beads having a bulk volume of about 20 cm³ after condition adjustment as a measurement sample, apparent volume Va was accurately measured by a submersion method. The measurement sample whose appar-ent volume Va was measured was sufficiently dried, and then true volume value Vx of the measurement sample to be measured by AccuPyc II 1340 manufactured by Shimadzu Corporation was measured in accordance with Procedure C described in ASTM-D2856-70. Based on these volume values Va and Vx, the closed cell content was calculated by the following formula (3), and the average value of five samples (N=5) was defined as the closed cell content of the expanded beads.

[Mathematical formula 3]

$$\text{Closed cell content } (\%) = (Vx - W/\rho) \times 100/(Va - W/\rho) \tag{3}$$

wherein

Vx: True volume of expanded beads measured by the above method, that is, sum of the volume of resin constituting the expanded beads and the total volume of cells in a closed cell portion in the expanded beads (unit: cm³)

Va: Apparent volume of expanded beads measured from water level rise when the expanded beads are sub-merged in a measuring cylinder containing ethanol (unit: cm³)

W: Weight of sample for use in measurement of expanded beads (unit: g)

$\rho$: Density of resin constituting expanded beads (unit: g/cm³)

Method of Measuring Change-Point Temperature of Storage Modulus

First, according to JIS K7095: 2012, the storage modulus obtained by measuring dynamic viscoelasticity measure-ment (DMA) of the polyamide-based resin expanded beads was measured to create a graph, whereby the change-point temperature was specified. As the DMA measurement device, DMA7100 manufactured by Hitachi High-Tech Sci-ence Corporation was used.

Specifically, one expanded bead of which the water con-tent had been adjusted in advance was fixed with a jig, and the storage modulus of the expanded beads was measured by changing the temperature from −50° C. to 150° C. at a temperature rising rate of 2° C./min in a compression mode and at a constant frequency (1 Hz). Then, as shown in FIG. 2, a graph was created by plotting the measurement results with the storage modulus on the vertical axis and the temperature on the horizontal axis. In such a graph, a perpendicular line was drawn to a temperature axis down-ward from intersection B of extended line L1 obtained by extending a straight line before the first rapid decrease of the storage modulus to the high temperature side and extended line L2 obtained by extending a straight line of an intermediate line after the first rapid decrease of the storage modulus to the low temperature side, and a temperature indicated by the perpendicular line was defined as the change-point temperature of storage modulus. The above measurement was performed on 10 expanded beads, and the arithmetic average value thereof was defined as the change-point temperature of storage modulus of the polyamide-based resin expanded beads.

Method for Measuring Water Content

The water content of the polyamide-based resin expanded beads was determined using the Karl Fischer method described above. Specifically, first, about 0.2 g of poly-amide-based resin expanded beads was weighed and used as a test piece. Subsequently, the moisture inside the test piece was vaporized by heating the test piece to a temperature of 160° C. using a heating vaporizer (an automatic heating vaporizer SE320 manufactured by HIRANUMA Co., Ltd.). This moisture was guided to a Karl Fischer moisture mea-suring device (AQ-2200A manufactured by HIRANUMA Co., Ltd.) connected to the heating vaporizer, the moisture amount was measured, and the water content in the expanded beads was calculated. Measurement conditions (titration conditions) were as follows: waiting time: 40 seconds, electrolytic current: MEDIUM, and minimum elec-trolysis amount: 5 µg. The above measurement was per-formed on five test pieces, and the arithmetic average value thereof was defined as the water content of the polyamide-based resin expanded beads.

Method for Measuring Internal Pressure

Internal pressure P of the polyamide-based resin expanded beads was determined by the following method using the following formulas (1) and (2). The weight W7 of a small bag was measured in advance.

First, polyamide-based resin expanded beads to which internal pressure was applied (wet pressurized expanded beads) were taken in an arbitrary amount small bag from a group of polyamide-based resin expanded beads to which internal pressure was applied (a wet pressurized expanded beads group), and the weight W2 was measured.

Further, an arbitrary amount of sample was separately collected from the group of polyamide-based resin expanded beads (wet pressurized expanded beads group), and the water content in the sample was measured in advance with a Karl Fischer moisture meter. Moisture amount measured with a Karl Fischer moisture meter was defined as W6, and the amount of sample subjected to measurement with a Karl Fischer moisture meter was defined as W5.

The amount W3 of moisture contained in the wet pres-surized expanded beads was determined by dividing a value obtained by subtracting the weight W7 of the small bag from the weight W2 of the wet pressurized expanded beads by the amount W5 of sample measured by a Karl Fischer moisture meter, and multiplying the resulting value by the moisture amount W6 measured by a Karl Fischer moisture meter.

The weight W1 of dry pressurized expanded beads was determined by subtracting a value obtained by adding the amount W3 of moisture in the wet pressurized expanded beads and the weight W7 of the bag obtained above from the weight W2 of the wet pressurized expanded beads.

Subsequently, the wet pressurized expanded beads were stored together with the small bag in a thermo-hygrostat at 80° C. for about 48 hours to release the internal pressure. Then, the polyamide-based resin expanded beads whose pressure had been released were taken out from the thermo-hygrostat, and dried under the conditions of 160° C. and 20 hours. Then, the weight W4 of the dried polyamide-based resin expanded beads (dried expanded beads) taken out from the small bag was measured, and the air amount Wa con-tained in the polyamide-based resin expanded beads to which internal pressure was applied was calculated by the following formula (1). The Karl Fischer moisture meter and measurement conditions were the same as those for the measurement of the water content of the polyamide-based resin expanded beads.

[Mathematical formula 4]

$$\text{Air amount } Wa = W1 - W4 \qquad (1)$$
$$= (W2 - W3 - W7) - W4$$
$$= \left[ (W2 - (W2 - W7) \times W6/W5) - W7 \right] - W4$$

W1: Weight (g) of dry pressurized expanded beads
W2: Weight (g) of wet pressurized expanded beads weight with weight of small bag
W3: Amount (g) of moisture in wet pressurized expanded beads
W4: Weight (g) of dry expanded beads
W5: Amount (g) of sample subjected to measurement with Karl Fischer moisture meter
W6: Moisture amount (g) measured by Karl Fischer moisture meter
W7: Weight (g) of small bag
Wa: Air amount (g)

The internal pressure of the polyamide-based resin expanded beads to which the internal pressure P had been applied was determined using the air amount Wa (g) deter-mined as described above in the following formula (2).

[Mathematical formula 5]

Internal pressure P (MPa (G))=[($Wa$×0.00831×296)/ 28.8]/[($W4$/Apparent density of expanded beads (g/L))−($W4$/Density of resin (g/L))] $\qquad$ (2)

Production of Polyamide-Based Resin Beads

A polyamide-based resin, a cell controlling agent, and a terminal blocking agent were supplied to a melt-kneading device, melt-kneaded, extruded into a strand, cooled in water, then cut with a pelletizer, and dried to obtain poly-amide-based resin beads having an average weight of 2 mg per bead.

As the polyamide-based resin, a polyamide 6/66 copoly-mer (polyamide 6/polyamide 66=85/15; UBE nylon 5033B, manufactured by Ube Industries, Ltd., melting point: 197° C., density: 1.14 kg/m³, flexural modulus: 1300 MPa, MFR: 3.5 g/10 min) was used.

As the cell controlling agent, "Talcan Pawder (registered trademark) PK-S" (manufactured by Hayashi Kasei Co., Ltd.) was used. The cell controlling agent was adjusted and supplied so that the content in all the supplied materials was 8000 ppm by weight.

As the terminal blocking agent, "Stabaxol (registered trademark) P" (manufactured by Rhein Chemie Corpora-tion) was used. The terminal blocking agent was adjusted and supplied so as to be 1 part by weight per 100 parts by weight of the polyamide-based resin. However, in Example 12, a terminal blocking agent was not added.

Production of Polyamide-Based Resin Expanded Beads

Ten kilograms of the obtained polyamide-based resin beads and 310 liters of water as a dispersion were charged into a 400-liter autoclave equipped with a stirrer, and 3.0 parts by weight of kaolin as a dispersant and 0.08 parts by weight of sodium alkylbenzene sulfonate as a surfactant were further added to the dispersion per 100 parts by weight of the polyamide-based resin beads.

While stirring the contents in the autoclave, the temperature was raised from room temperature (23° C.), and after reaching 136° C., carbon dioxide as a blowing agent was injected into the autoclave until the pressure in the autoclave reached 4.0 MPa (G). At this time, the temperature rising time to reach 136° C. from room temperature (23° C.) was 30 minutes. Next, a state of 136° C. and 4.0 MPa (G) was maintained for 15 minutes.

Thereafter, the polyamide-based resin beads impregnated with the blowing agent were released together with the dispersion to atmospheric pressure (0.1 MPa) (expanding temperature: 136° C.). The resulting polyamide-based resin expanded beads were aged in an oven at 60° C. for 24 hours and then gradually cooled to obtain polyamide-based resin expanded beads in a dry state.

The apparent density of the resulting expanded beads (one-stage expanded beads), the heat of fusion at the high-temperature peak, and the closed cell content were measured, and the results are shown in Tables 1 and 2. In Examples 3 to 11 and Comparative Examples 2 and 3, each temperature of temperature rise, maintenance, and expanding was set to 136.5° C.

Water Containing Step

Using the polyamide-based resin expanded beads obtained as described above, the polyamide-based resin expanded beads in a dry state and water were put in a poly bag, and then the mouth of the poly bag was closed, the bag was shaken well, and the moisture content was adjusted by performing a water containing step of sufficiently mixing the polyamide-based resin expanded beads and water until a predetermined water content was obtained. The water content of the expanded beads thus obtained and the change-point temperature T of storage modulus of the expanded beads after the water containing step were measured and shown in Tables 1 and 2.

Internal Pressure Applying Step

One hundred and eighty grams of the polyamide-based resin expanded beads obtained by adjusting the water content as described above was placed into a 3-liter pressure-resistant container set at the pressurization temperature shown in Tables 1 and 2. Tables 1 and 2 also show the difference between each pressurization temperature and the change-point temperature of storage modulus of the polyamide-based resin expanded beads used.

The expanded beads obtained by adjusting the water content were placed into a pressure-resistant container and sealed, and at the same time, air was injected as a physical blowing agent to start the internal pressure applying step. Air as a physical blowing agent was injected at a pressure increase rate shown in Tables 1 and 2, and after the pressure (pressurized pressure) in the pressure-resistant container reached 0.6 MPa (G), the pressure was kept constant at 0.6 MPa (G). The pressurization time (time from the injection of the physical blowing agent to take out of the polyamide-based resin expanded beads to which internal pressure is applied from the pressure-resistant container) and the pressure increase rate at this time are shown in Tables 1 and 2. The pressurization temperature was kept constant.

Immediately after the elapse of the pressurization time shown in Tables 1 and 2, the polyamide-based resin to which internal pressure was applied was taken out from the pressure-resistant container, and the internal pressure and the water content (B) of the polyamide-based resin expanded beads were measured. The internal pressure increase rate was calculated by dividing the measured internal pressure by the pressurization time. The measured internal pressure and the internal pressure increase rate are both shown in Tables 1 and 2.

In addition, the appearance of the polyamide-based resin expanded beads to which internal pressure was applied obtained as described above was observed, and when there was no yellowing or wrinkles, the polyamide-based resin expanded beads were evaluated as good (A).

Heating and Foaming Step

As described above, using the polyamide-based resin expanded beads to which internal pressure was applied, the heating and foaming step was performed as follows.

A 600-liter autoclave equipped with a stirrer was injected with steam (original pressure 0.3 MPa (G)) as a heating medium to set steam pressure and steam temperature to values shown in Tables 1 and 2. Then, 180 g of the polyamide-based resin expanded beads to which internal pressure was applied obtained as described above was charged into the autoclave, sealed, pressurized and heated with stirring to further expand the expanded beads. Fifteen seconds after the polyamide-based resin expanded beads to which internal pressure was applied were charged into the autoclave, the autoclave was opened, and the polyamide-based resin expanded beads were taken out. The resulting polyamide-based resin expanded beads were aged in an oven at 40° C. for 20 hours and then gradually cooled to obtain polyamide-based resin multi-stage expanded beads (two-stage expanded beads).

The apparent density and the closed cell content of the polyamide-based resin multi-stage expanded beads obtained as described above were measured. In addition, the apparent density ratio was calculated by dividing the apparent density of the polyamide-based resin multi-stage expanded beads (two-stage expanded beads) by the apparent density of the polyamide-based resin expanded beads in a wet state used in the internal pressure applying step described above (one-stage expanded beads). The apparent density, the closed cell content, and the apparent density ratio are all shown in Tables 1 and 2.

Production of Molded Article of Polyamide-Based Resin Expanded Beads

An expanded beads molded article was prepared as follows using the polyamide-based resin multi-stage expanded beads obtained as described above.

First, the obtained polyamide-based resin multi-stage expanded beads were filled in a flat plate mold having a length of 200 mm×a width of 65 mm×a thickness of 40 mm, and in-mold molding by steam heating was performed to obtain a plate-shaped expanded beads molded article. The heating method is carried out by supplying steam for 5 seconds with drain valves on both sides of the mold opened for preheating (exhaust step), then supplying steam from the mold on the moving side, followed by supplying steam from the mold on the stationary side, and then heating to the molding heating steam pressure (molding pressure=molding steam pressure).

After completion of the heating, the pressure was released, and the molded article was cooled with water until the surface pressure due to the expansion force of the molded article decreased to 0.02 MPa (gauge pressure), then the mold was opened, and the molded article was taken out from the mold. The resulting molded article was aged in an oven at 80° C. for 12 hours, and then gradually cooled to room temperature. In this way, an expanded beads molded article was obtained.

Evaluation of Moldable Range

The expanded beads molded article was prepared by changing the steam pressure, and was judged according to the following criteria. Specifically, the expanded beads molded article was molded in the same manner as in the method for preparing an expanded beads molded article described above except that the steam pressure was changed at intervals of 0.02 MPa (G) between 0.10 to 0.20 MPa (G).

The obtained expanded beads molded article was evaluated for three items of fusion-bonding property, surface property, and recoverability as follows. Then, the steam pressure evaluated as "A" in any of the three evaluations was determined as the pressure at which the expanded beads molded article is moldable. In the "moldable range" column of Tables 1 to 2, the range of the steam pressure at which the expanded beads molded article is moldable was shown. In addition, among the moldable steam pressures, the thickness recovery ratio of the molded article obtained by the lower limit molding pressure was shown. The method for measuring the thickness recovery ratio has been described in the recoverability evaluation described later.

Evaluation of Fusion-Bonding Property

The fusion-bonding ratio of the expanded beads molded article was determined based on the ratio of the number of expanded beads of which the material was broken among the expanded beads exposed on the fracture surface when the expanded beads molded article was broken. Specifically, first, a test piece (length 100 mm×width 100 mm×thickness: thickness of the molded article) was cut out from the expanded beads molded article, a cut of about 5 mm was made in the thickness direction of each test piece with a cutter knife, and then the test piece was broken from the cut part. Next, the number (n) of the expanded beads and the number (b) of the material-destroyed expanded beads present on the fracture surface of the expanded beads molded article were measured, and the ratio (b/n) of (b) to (n) was expressed as a percentage, and the fusion-bonding ratio (%) was evaluated as follows.

A: The fusion-bonding ratio was 90% or more.

B: The fusion-bonding ratio was less than 90%.

Surface Evaluation

The surface state of the expanded beads molded article was evaluated as follows.

A: Expanded beads gap on the surface of the molded article is completely filled.

B: Expanded beads gap on the surface of the molded article is not filled.

Evaluation of Recoverability

The thicknesses of the end part (10 mm inside from the end) and the central part (portion equally divided into two in both longitudinal direction and lateral direction) of the expanded beads molded article corresponding to dimensions of the flat plate-shaped mold used in the in-mold molding were measured. Subsequently, the thickness recovery ratio of the expanded beads molded article (thickness of molded article central part/thickness of molded article end part×100 (%)) was calculated and evaluated as follows.

A: The thickness recovery ratio is 90% or more.

B: The thickness recovery ratio is less than 90%.

TABLE 1

| | | | Example 1 | Example 2 | Example 3 | Example 4 | Example 5 | Example 6 | Example 7 |
|---|---|---|---|---|---|---|---|---|---|
| | Raw material | — | 5033B | 5033B | 5033B | 5033B | 5033B | 5033B | 5033B |
| One-stage expanded beads | Apparent density | kg/m³ | 110 | 110 | 92 | 92 | 93 | 104 | 104 |
| | Heat of fusion of high-temperature peak | J/g | 10.1 | 9.6 | 7.0 | 7.0 | 7.1 | 7.8 | 7.8 |
| | Closed cell content | % | 93 | 93 | 93 | 93 | 90 | 90 | 90 |
| Water containing step | Execution of water containing step | | Yes | Yes | Yes | Yes | Yes | Yes | Yes |
| | Water content (A) (*1) | % | 10 | 9.6 | 10.9 | 9.6 | 9.5 | 5.5 | 4.7 |
| Change-point temperature T of storage modulus of expanded beads after water containing step | | ° C. | −16.1 | −15.0 | −18.2 | −15.0 | −14.7 | 3.8 | 9.3 |
| Pressurized condition (Internal pressure applying step) | Pressurization temperature (*2) | ° C. | 20 | 50 | 20 | 50 | 70 | 20 | 50 |
| | Pressurization temperature - Change-point temperature T | ° C. | 36 | 65 | 38 | 65 | 85 | 16 | 41 |
| | Pressurized pressure | MPa(G) | 0.6 | 0.6 | 0.6 | 0.6 | 0.6 | 0.6 | 0.6 |
| | Pressure increase rate | MPa/hr | 0.0125 | 0.0125 | 0.025 | 0.025 | 0.1 | 0.025 | 0.025 |
| | Pressurization time | hr | 48 | 48 | 24 | 24 | 6 | 24 | 24 |
| Expanded beads to which internal pressure is applied | Internal pressure | MPa(G) | 0.28 | 0.36 | 0.16 | 0.23 | 0.20 | 0.11 | 0.15 |
| | Water content (B) | % | 8.5 | 5.4 | 9.7 | 4.7 | 6.7 | 2.5 | 3.3 |
| | Internal pressure increase rate | MPa/hr | 0.006 | 0.008 | 0.007 | 0.010 | 0.033 | 0.005 | 0.006 |
| | Appearance evaluation | | A | A | A | A | A | A | A |
| Two-stage foaming condition (Heating and foaming step) | Steam pressure | Mpa(G) | 0.065 | 0.065 | 0.045 | 0.045 | 0.045 | 0.045 | 0.045 |
| | Steam temperature | ° C. | 79 | 79 | 77 | 77 | 77 | 77 | 77 |

TABLE 1-continued

|  |  |  | Example 1 | Example 2 | Example 3 | Example 4 | Example 5 | Example 6 | Example 7 |
|---|---|---|---|---|---|---|---|---|---|
| Two-stage expanded beads | Apparent density | kg/m³ | 57 | 48 | 58 | 51 | 48 | 67 | 57 |
|  | Apparent density ratio of two-stage expanded beads/One-stage expanded beads | — | 0.52 | 0.44 | 0.61 | 0.55 | 0.52 | 0.64 | 0.55 |
|  | Closed cell content | % | 91 | 90 | 92 | 91 | 88 | 89 | 88 |
|  | Moldable range | MPa(G) | 0.18 | 0.18 | 0.12-0.14 | 0.12-0.14 | 0.12-0.14 | 0.12-0.14 | 0.12-0.14 |
| Molded article | Thickness recovery ratio | % | 95 | 95 | 95 | 95 | 95 | 95 | 95 |

(*1) When the water containing step was not executed, the water content of one-stage expanded beads after one-stage expansion was determined
(*2) Value measured by a thermometer installed in the pressure-resistant container

TABLE 2

|  |  |  | Example 1 | Example 2 | Example 3 | Example 4 | Example 5 | Example 6 | Example 7 |
|---|---|---|---|---|---|---|---|---|---|
|  | Raw material | — | 5033B | 5033B | 5033B | 5033B | 5033B | 5033B | 5033B |
| One-stage expanded beads | Apparent density | kg/m³ | 110 | 110 | 92 | 92 | 93 | 104 | 104 |
|  | Heat of fusion of high-temperature peak | J/g | 10.1 | 9.6 | 7.0 | 7.0 | 7.1 | 7.8 | 7.8 |
|  | Closed cell content | % | 93 | 93 | 93 | 93 | 90 | 90 | 90 |
| Water containing step | Execution of water containing step |  | Yes | Yes | Yes | Yes | Yes | Yes | Yes |
|  | Water content (A) (*1) | % | 10 | 9.6 | 10.9 | 9.6 | 9.5 | 5.5 | 4.7 |
|  | Change-point temperature T of storage modulus of expended beads after water containing step | ° C. | −16.1 | −15.0 | −18.2 | −15.0 | −14.7 | 3.8 | 9.3 |
| Pressurized condition (Internal pressure applying step) | Pressurization temperature (*2) | ° C. | 20 | 50 | 20 | 50 | 70 | 20 | 50 |
|  | Pressurization temperature - Change-point temperature T | ° C. | 36 | 65 | 38 | 65 | 85 | 16 | 41 |
|  | Pressurized pressure | MPa(G) | 0.6 | 0.6 | 0.6 | 0.6 | 0.6 | 0.6 | 0.6 |
|  | Pressure increase rate | MPa/hr | 0.0125 | 0.0125 | 0.025 | 0.025 | 0.1 | 0.025 | 0.025 |
|  | Pressurization time | hr | 48 | 48 | 24 | 24 | 6 | 24 | 24 |
| Expanded beads to which internal pressure is applied | Internal pressure | MPa(G) | 0.28 | 0.36 | 0.16 | 0.23 | 0.20 | 0.11 | 0.15 |
|  | Water content (B) | % | 8.5 | 5.4 | 9.7 | 4.7 | 6.7 | 2.5 | 3.3 |
|  | Internal pressure increase rate | MPa/hr | 0.006 | 0.008 | 0.007 | 0.010 | 0.033 | 0.005 | 0.006 |
|  | Appearance evaluation |  | A | A | A | A | A | A | A |
| Two-stage foaming condition (Heating and foaming step) | Steam pressure | Mpa(G) | 0.065 | 0.065 | 0.045 | 0.045 | 0.045 | 0.045 | 0.045 |
|  | Steam temperature | ° C. | 79 | 79 | 77 | 77 | 77 | 77 | 77 |
| Two-stage expanded beads | Apparent density | kg/m³ | 57 | 48 | 58 | 51 | 48 | 67 | 57 |
|  | Apparent density ratio of two-stage expanded beads/One-stage expanded beads | — | 0.52 | 0.44 | 0.61 | 0.55 | 0.52 | 0.64 | 0.55 |
|  | Closed cell content | % | 91 | 90 | 92 | 91 | 88 | 89 | 88 |
|  | Moldable range | MPa(G) | 0.18 | 0.18 | 0.12-0.14 | 0.12-0.14 | 0.12-0.14 | 0.12-0.14 | 0.12-0.14 |
| Molded article | Thickness recovery ratio | % | 95 | 95 | 95 | 95 | 95 | 95 | 95 |

(*1) When the water containing step was not executed, the water content of one-stage expanded beads after one-stage expansion was determined
(*2) Value measured by a thermometer installed in the pressure-resistant container As understood from Tables 1 and 2, according to Examples 1 to 12, sufficient internal pressure could be applied to the polyamide-based resin expanded beads under a low temperature condition or a short time condition. As a result, polyamide-based resin multi-stage expanded beads having a low apparent density could be produced with high productivity. In Examples 1 to 11 in which the terminal blocking agent was blended in the polyamide resin beads, moldability was more excellent, and the thickness recovery ratio was particularly high.

On the other hand, according to Comparative Example 1 and Comparative Example 2, since the water content of the polyamide-based resin expanded beads was too low, the efficiency of applying an internal pressure was significantly poor. Further, according to Comparative Example 3, since the polyamide-based resin expanded beads were impregnated with the physical blowing agent at a temperature lower than the change-point temperature of storage modulus of the polyamide-based resin expanded beads in a wet state, the efficiency of applying an internal pressure was significantly poor.

The present invention described above includes the following technical ideas.

(1) A method for producing polyamide-based resin multi-stage expanded beads, including an internal pressure applying step of placing polyamide-based resin expanded beads in a pressure-resistant container, impregnating the polyamide-based resin expanded beads with a physical blowing agent in the pressure-resistant container to apply an internal pressure higher than atmospheric pressure; and a heating and foaming step of heating and foaming the polyamide-based resin expanded beads to which internal pressure applied obtained in the internal pressure applying step to obtain polyamide-based resin multi-stage expanded beads having an apparent density lower than that of the polyamide-based resin expanded beads used in the internal pressure applying step, in the internal pressure applying step, the polyamide-based resin expanded beads in a wet state having a water content of 1% or more being impregnated with the physical blowing agent at a temperature higher than change-point temperature of storage modulus of the polyamide-based resin expanded beads in a wet state.

(2) The method for producing polyamide-based resin multi-stage expanded beads according to (1), in which in the internal pressure applying step, the polyamide-based resin expanded beads in a wet state are impregnated with the physical blowing agent at a temperature 30° C. or more higher than the change-point temperature of storage modulus of the polyamide-based resin expanded beads in a wet state at the start of the internal pressure applying step.

(3) The method for producing polyamide-based resin multi-stage expanded beads according to (1) or (2), in which in the internal pressure applying step, the polyamide-based resin expand beads in a wet state are impregnated with the physical blowing agent at a temperature of 120° C. or less.

(4) The method for producing polyamide-based resin multi-stage expanded beads according to any one of (1) to (3), in which the water content of the polyamide-based resin expanded beads in a wet state is 3.0% or more.

(5) The method for producing polyamide-based resin multi-stage expanded beads according to any one of (1) to (4), in which the water content of the polyamide-based resin expanded beads in a wet state is 4.5% or more.

(6) The method for producing polyamide-based resin multi-stage expanded beads according to any one of (1) to (5), in which in the internal pressure applying step, the polyamide-based resin expanded beads in a wet state are impregnated with the physical blowing agent such that the internal pressure increase rate is 0.003 MPa/hr or more and 0.05 MPa/hr or less.

(7) The method for producing polyamide-based resin multi-stage expanded beads according to any one of (1) to (6), which the apparent density of the polyamide-based resin multi-stage expanded beads is 100 kg/m³ or less.

(8) The method for producing polyamide-based resin multi stage expanded beads according to any one of (1) to (7), in which the polyamide-based resin expanded beads used in the internal pressure applying step contain a terminal blocking agent, and the content of the terminal blocking agent in the polyamide-based resin expanded beads is 0.1 parts by weight or more and 3.0 parts by weight or less per 100 parts by weight of the polyamide resin.

(9) The method for producing polyamide-based resin multi-stage expanded beads according to any one of (1) to (8), in which the ratio of the apparent density of the polyamide-based resin multi-stage expanded beads to the apparent density of the polyamide-based resin expanded beads used in the internal pressure applying step is 0.70 or less.

(10) The method for producing polyamide-based resin multi-stage expanded beads according to any one of (1) to (9), in which in the heating and foaming step, the polyamide-based resin expanded beads to which internal pressure is applied are expanded by heating with a heating medium having a temperature higher than the change-point temperature of storage modulus of the polyamide-based resin expanded beads to which internal pressure is applied and lower than the melting point of the polyamide-based resin constituting the polyamide-based resin expanded beads to which internal pressure is applied.

(11) The method for producing polyamide-based resin multi-stage expanded beads according to any one of (1) to (10), in which in the heating and foaming step, the polyamide-based resin expanded beads to which internal pressure is applied are expanded by heating with steam.

(12) The method for producing polyamide-based resin multi-stage expanded beads according to any one of (1) to (11), in which in the internal pressure applying step, the polyamide-based resin expanded beads are charged into a pressure-resistant container, and the physical blowing agent is injected into the pressure-resistant container so that the pressure increase rate in the pressure-resistant container is 0.01 MPa/hr or more and 0.2 MPa/hr or less to impregnate the polyamide-based resin expanded beads in a wet state with the physical blowing agent.

The invention claimed is:

1. A method for producing polyamide-based resin multi-stage expanded beads, comprising an internal pressure applying step of placing polyamide-based resin expanded beads in a pressure-resistant container, impregnating the polyamide-based resin expanded beads with a physical blowing agent in the pressure-resistant container to apply an internal pressure higher than atmospheric pressure; and a heating and expanding step of heating and expanding the polyamide-based resin expanded beads to which internal pressure is applied obtained in the internal pressure applying step to obtain polyamide-based resin multi-stage expanded beads having an apparent density lower than that of the polyamide-based resin expanded beads used in the internal pressure applying step, in the internal pressure applying step, the polyamide-based resin expanded beads in a moisture absorbing state having a water content of 1% or more being impregnated with the physical blowing agent at a temperature higher than change point temperature of storage modulus of the polyamide-based resin expanded beads in a moisture absorbing state.

2. The method for producing polyamide-based resin multi-stage expanded beads according to claim 1, wherein in the internal pressure applying step, the polyamide-based resin expanded beads in a moisture absorbing state are impregnated with the physical blowing agent at a temperature 30° C. or more higher than the change point temperature of storage modulus of the polyamide-based resin expanded beads in a moisture absorbing state at the start of the internal pressure applying step.

3. The method for producing polyamide-based resin multi-stage expanded beads according to claim 1, wherein in the internal pressure applying step, the polyamide-based resin expanded beads in a moisture absorbing state are impregnated with the physical blowing agent at a temperature of 120° C. or less.

4. The method for producing polyamide-based resin multi-stage expanded beads according to claim 1, wherein the water content of the polyamide-based resin expanded beads in a wet state is 3.0% or more.

5. The method for producing polyamide-based resin multi-stage expanded beads according to claim 1, wherein the water content of the polyamide-based resin expanded beads in a wet state is 4.5% or more.

6. The method for producing polyamide-based resin multi-stage expanded beads according to claim 1, wherein in the internal pressure applying step, the polyamide-based resin expanded beads in a wet state are impregnated with the physical blowing agent such that the internal pressure increase rate is 0.003 MPa/hr or more and 0.05 MPa/hr or less.

7. The method for producing polyamide-based resin multi-stage expanded beads according to claim 1, wherein the apparent density of the polyamide-based resin multi-stage expanded beads is 100 kg/m3 or less.

8. The method for producing polyamide-based resin multi-stage expanded beads according to claim 1, wherein the polyamide-based resin expanded beads used in the internal pressure applying step contain a terminal blocking agent, and the content of the terminal blocking agent in the polyamide-based resin expanded beads is 0.1 parts by weight or more and 3.0 parts by weight or less per 100 parts by weight of the polyamide resin.

9. The method for producing polyamide-based resin multi-stage expanded beads according to claim 1, wherein the ratio of the apparent density of the polyamide-based resin multi-stage expanded beads to the apparent density of the polyamide-based resin expanded beads used in the internal pressure applying step is 0.70 or less.

10. The method for producing polyamide-based resin multi-stage expanded beads according to claim 1, wherein in the heating and foaming step, the polyamide-based resin expanded beads to which internal pressure is applied are expanded by heating with a heating medium having a temperature higher than the change-point temperature of storage modulus of the polyamide-based resin expanded beads to which internal pressure is applied and lower than the melting point of the polyamide-based resin constituting the polyamide-based resin expanded beads to which internal pressure is applied.

11. The method for producing polyamide-based resin multi-stage expanded beads according to claim 1, wherein in the heating and foaming step, the polyamide-based resin expanded beads to which internal pressure is applied are expanded by heating with steam.

12. The method for producing polyamide-based resin multi-stage expanded beads according to claim 1, wherein in the internal pressure applying step, the polyamide-based resin expanded beads are charged into a pressure-resistant container, and the physical blowing agent is injected into the pressure-resistant container so that the pressure increase rate in the pressure-resistant container is 0.01 MPa/hr or more and 0.2 MPa/hr or less to impregnate the polyamide-based resin expanded beads in a wet state with the physical blowing agent.

* * * * *